US012747839B2

(12) United States Patent
Lavin et al.

(10) Patent No.: US 12,747,839 B2
(45) **Date of Patent: *Sep. 29, 2026**

(54) MODULAR, RECESSED LIGHTING SYSTEM

(71) Applicant: Tech Lighting LLC, Skokie, IL (US)

(72) Inventors: Sean Lavin, Winnetka, IL (US); Richard Kim, Skokie, IL (US)

(73) Assignee: Tech Lighting LLC, Skokie, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/907,168

(22) Filed: Oct. 4, 2024

(65) Prior Publication Data

US 2025/0027622 A1 Jan. 23, 2025

Related U.S. Application Data

(63) Continuation of application No. 17/976,404, filed on Oct. 28, 2022, now Pat. No. 12,123,559, which is a (Continued)

(51) Int. Cl.

*F21S 2/00* (2016.01)
*F21V 3/02* (2006.01)

(Continued)

(52) U.S. Cl.

CPC ................ *F21S 2/005* (2013.01); *F21V 3/02* (2013.01); *F21V 23/06* (2013.01); *H01R 33/94* (2013.01); *F21Y 2115/10* (2016.08)

(58) Field of Classification Search

CPC .......... F21S 2/005; F21S 4/20; F21S 8/04–06; F21V 3/02; F21V 21/03; F21V 23/06;

(Continued)

(56) References Cited

U.S. PATENT DOCUMENTS 5,816,849 A * 10/1998 Schmidt ................. H01R 24/28 439/679
8,061,865 B2 11/2011 Piepgras et al.

(Continued)

OTHER PUBLICATIONS

Non-Final Office Action, corresponding U.S. Appl. No. 17/388,893, dated May 11, 2022.

(Continued)

*Primary Examiner* — Jason M Han

(74) *Attorney, Agent, or Firm* — MARSHALL, GERSTEIN & BORUN LLP

(57) ABSTRACT

A modular lighting system adapted to be installed in and illuminate an environment. The lighting system includes a first light fixture including a first canopy assembly adapted to engage a desired surface in the environment, a first light-emitting diode (LED) module, and a second LED module. The first LED module has a first connector assembly configured to mechanically and electrically connect the first LED module to the first light fixture via the first canopy assembly, the second connector assembly is configured to mechanically and electrically connect the second LED module to the first LED module, and the first LED module is interchangeable with a third LED module including a third connector assembly configured to mechanically and electrically connect the third LED module to both the second LED module and the first light fixture via the first canopy assembly.

15 Claims, 14 Drawing Sheets

Related U.S. Application Data continuation of application No. 17/388,893, filed on Jul. 29, 2021, now Pat. No. 11,486,553.

(51) Int. Cl.

| | |
|---|---|
| ***F21V 23/06*** | (2006.01) |
| ***F21Y 115/10*** | (2016.01) |
| ***H01R 33/94*** | (2006.01) |

(58) Field of Classification Search

CPC ..... F21Y 2115/10; H01R 33/06; H01R 33/94; H01R 35/04; H01R 2103/00

See application file for complete search history.

(56) References Cited

U.S. PATENT DOCUMENTS

| | | | | |
|---|---|---|---|---|
| 10,274,180 | B2 * | 4/2019 | Shine | F21K 9/20 |
| 10,907,785 | B2 * | 2/2021 | Shine | F21S 2/005 |
| 2013/0114241 | A1 | 5/2013 | van de Ven et al. | |
| 2013/0279179 | A1 | 10/2013 | Pearson et al. | |
| 2019/0211983 | A1 | 7/2019 | Shine et al. | |
| 2020/0132262 | A1 | 4/2020 | Sonneman et al. | |

OTHER PUBLICATIONS

Non-Final Office Action, corresponding U.S. Appl. No. 17/976,404, dated Mar. 8, 2024.

* cited by examiner

MODULAR, RECESSED LIGHTING SYSTEM

FIELD OF DISCLOSURE

The present disclosure generally relates to lighting systems, and more particularly, a modular, recessed lighting system.

BACKGROUND

Residential buildings, commercial buildings, and industrial buildings are equipped with lighting systems that typically include several light fixtures configured to illuminate certain environments. In many cases, these lighting systems are recessed lighting systems that provide the effect of light shining through a hole in a ceiling or a wall. Recessed lighting systems generally include one or more light fixtures installed in a ceiling or wall recess. These light fixtures typically include various components (e.g., light-emitting diodes) that are fixed in place relative to one another.

SUMMARY

One aspect of the present disclosure provides a light-emitting diode (LED) module for use in a modular lighting system installed in an environment. The LED module is configured to illuminate the environment and includes a housing, a first printed circuit board (PCB) disposed within the housing at a position adjacent a first end of the housing, a second PCB disposed within the housing at a position adjacent a second end of the housing opposite the first end, a first LED disposed on the first PCB and configured to emit light, a second LED disposed on the second PCB and configured to emit light, and a connector assembly extending through the housing. The connector assembly includes a first connector sub-assembly and a second connector sub-assembly electrically connected to the first connector sub-assembly, the first connector sub-assembly extending outward from the first end of the housing, and the second connector sub-assembly extending outward from the second end of the housing, each of the first and second connectors adapted to removably, mechanically, and electrically connect the LED module to another LED module or a light fixture in the modular lighting system.

Another aspect of the present disclosure provides a modular lighting system adapted to be installed in an environment. The modular lighting system is configured to illuminate the environment and includes a first light fixture including a first canopy assembly adapted to engage a desired surface in the environment, a first light-emitting diode (LED) module including a first housing, a first LED carried by the first housing and configured to emit light into the environment, and a first connector assembly extending through the first housing, and a second LED module including a second housing, a second LED carried by the second housing and configured to emit light into the environment, and a second connector assembly extending through the second housing. The first connector assembly is configured to mechanically and electrically connect the first LED module to the first light fixture via the first canopy assembly. The second connector assembly is configured to mechanically and electrically connect the second LED module to the first LED module. The first LED module is interchangeable with a third LED module including a third connector assembly configured to mechanically and electrically connect the third LED module to both the second LED module and the first light fixture via the first canopy assembly.

Another aspect of the present disclosure provides a modular lighting system adapted to be installed in an environment and configured to illuminate the environment. The modular lighting system includes a first light fixture including a first canopy assembly adapted to engage a first desired surface in the environment, a second light fixture including a second canopy assembly adapted to engage a second desired surface in the environment, and a plurality of light-emitting diode (LED) modules mechanically and electrically connected to the first canopy assembly and/or the second canopy assembly. The plurality of LED modules includes a first light-emitting diode (LED) module including a first housing, a first LED carried by the first housing, and a first connector assembly extending through the first housing, and a second LED module including a second housing, a second LED carried by the second housing, and a second connector assembly extending through the second housing. The first connector assembly is configured to mechanically and electrically connect the first LED module to the first light fixture via the first canopy assembly. The second connector assembly is configured to mechanically and electrically connect the second LED module to the first LED module or to the second light fixture via the second canopy assembly. The first LED module or the second LED module is interchangeable with a third LED module including a third connector assembly configured to mechanically and electrically connect the third LED module to the first light fixture, the second light fixture, or the first LED module.

DETAILED DESCRIPTION

Figure 1:
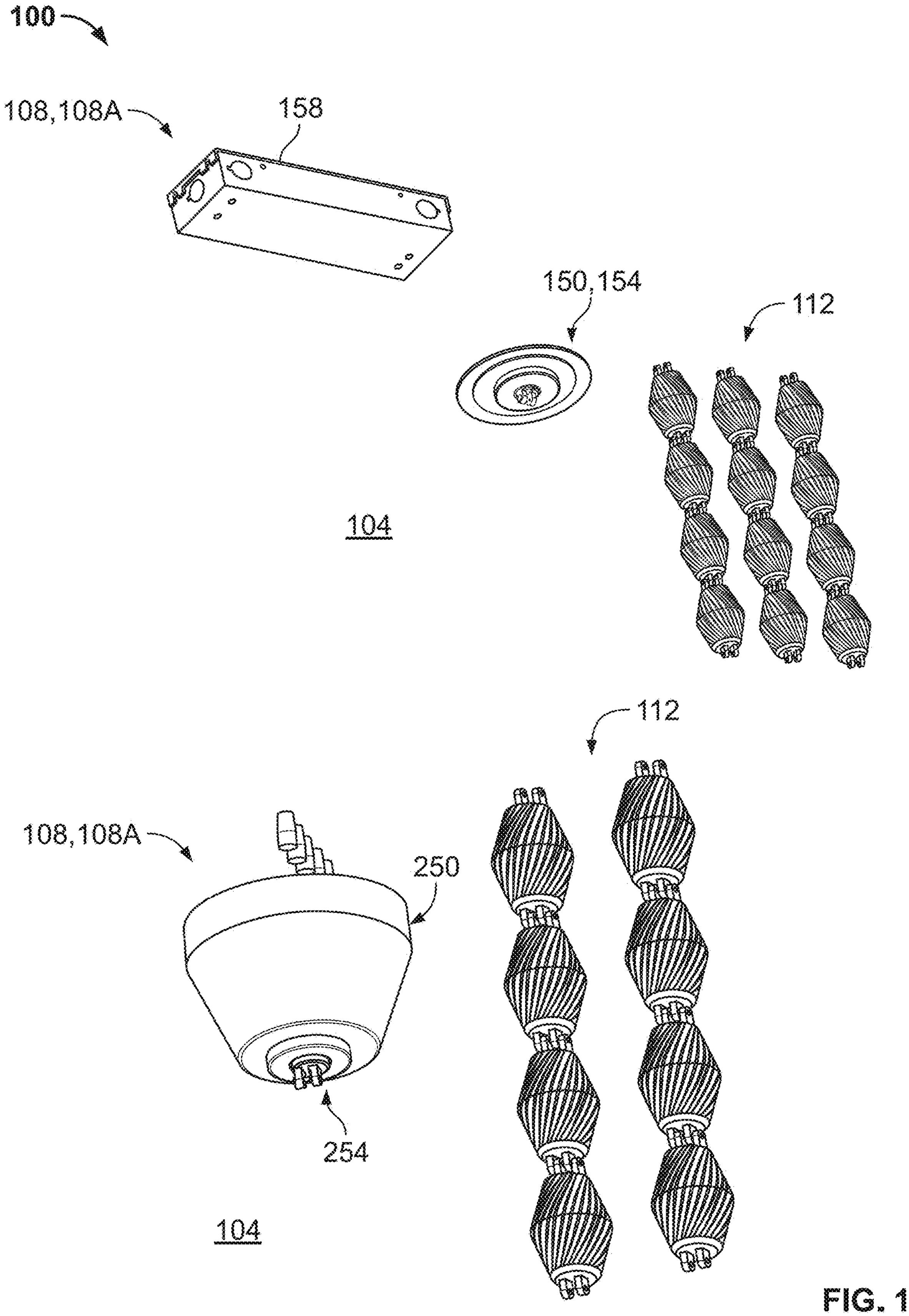
FIG. 1 is a perspective view of one example of a modular, recessed lighting system constructed in accordance with the principles of the present disclosure and including a plurality of light fixtures and a plurality of light-emitting diode (LED) modules.

The present disclosure is generally directed to a modular, recessed lighting system configured to illuminate an environment. The modular, recessed lighting system includes a plurality of light fixtures that are at least partially recessed within a desired surface (e.g., a ceiling, a floor, a wall) in the environment and can be customized to satisfy different aesthetic and/or illuminative requirements. The light fixtures are also provided with decorative patterns that enhance the architecture of the environment and a plurality of light-emitting diodes (LEDs) configured to illuminate or highlight these decorative patterns in an aesthetically pleasing manner.

FIGS. 1-9 depict one example of a modular, recessed lighting system 100 constructed in accordance with the principles of the present disclosure and implemented or included in an environment 104, such as, for example, a house, an apartment, a townhouse, a condominium, an office, or other space or building, or portions thereof. In this example, the modular, recessed lighting system 100 is a constant voltage system (e.g., 24 VDC), as will be described in greater detail below. The modular, recessed lighting system 100 generally includes a plurality of light fixtures 108 installed in and configured to illuminate the environment 104 as well as a plurality of LED modules 112 that can be selectively coupled to one another and to any of the plurality of light fixtures 108 in order to customize or adjust the plurality of light fixtures 108 (and, more generally, the recessed lighting system 100) as desired.

In this example, the recessed lighting system 100 includes two light fixtures 108—a first light fixture 108A and a second light fixture 108B that is different from the first light fixture 108A—adapted to be installed in or on a desired surface (e.g., the ceiling, a floor, a wall) in the environment 104. In other examples, the recessed lighting system 100 can include only one light fixture 108 or can include more than two light fixtures 108. For example, the recessed lighting system 100 can include three light fixtures 108—the first light fixture 108A, the second light fixture 108B, and another light fixture (that can be the same as or different than the first light fixture 108A or the second light fixture 108B). In other examples, the recessed lighting system 100 can include various combinations of the different light fixtures and the LED modules 112 described herein.

Figure 2:
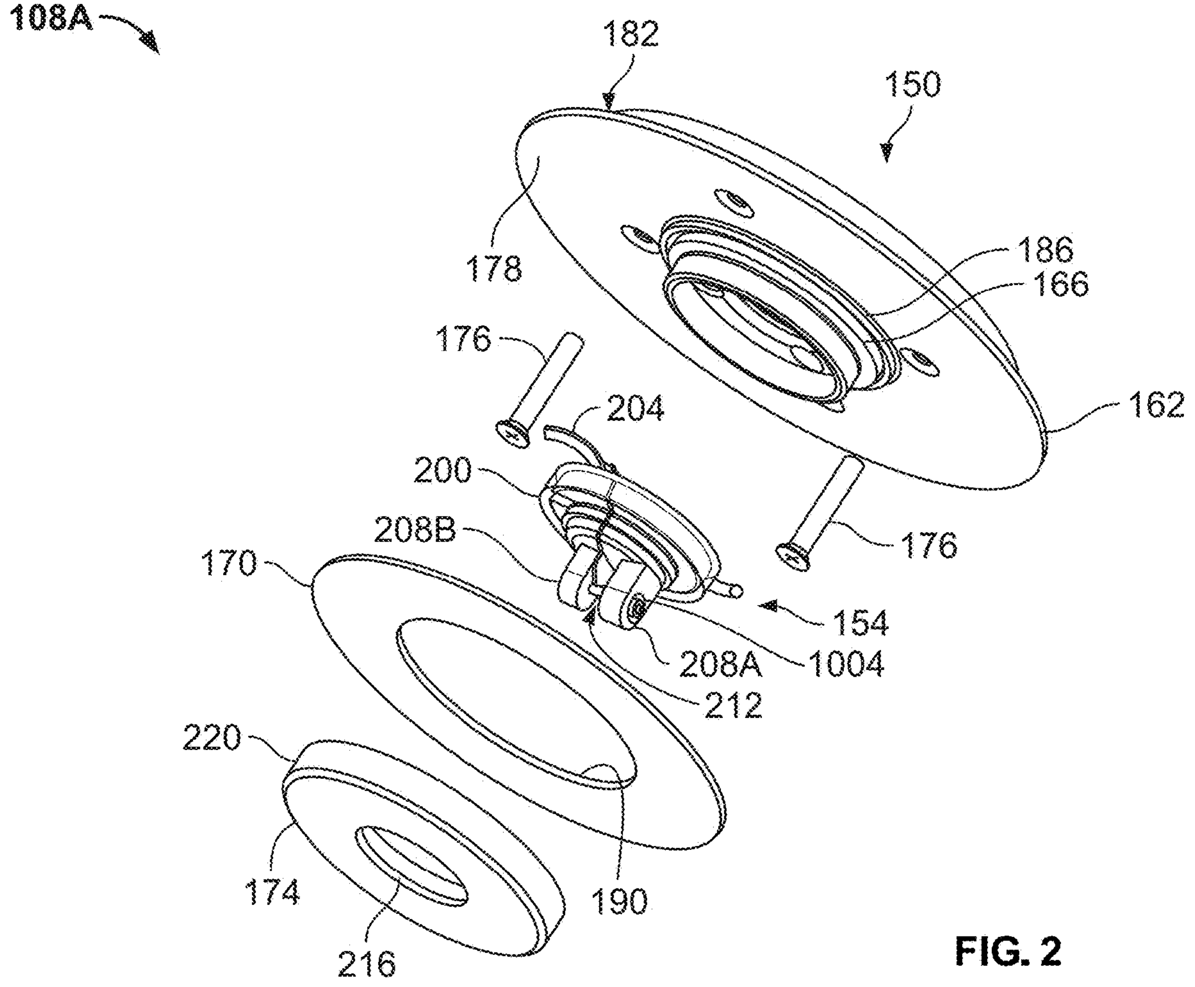
FIG. 2 is an exploded view of a first one of the light fixtures shown in FIG. 1.
Figure 3:
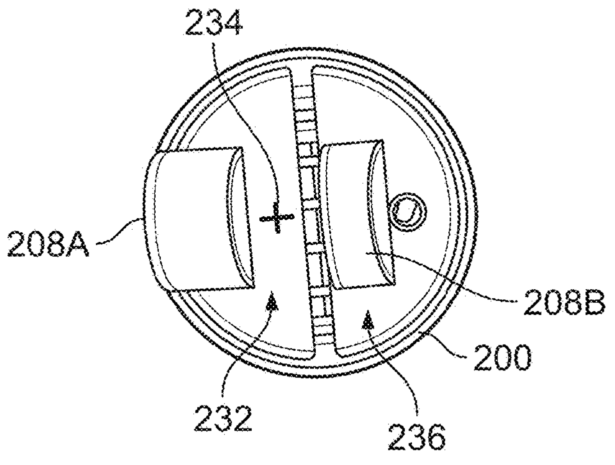
FIG. 3 is a bottom view of the first light fixture.

The first light fixture 108A is generally configured to be installed in or on the desired surface such that a portion of the first light fixture 108A protrudes outward (downward, upward, leftward, or rightward, depending upon the orientation) and into the environment 104. As illustrated in FIGS. 1-3, the first light fixture 108A generally includes a first canopy assembly 150, a first canopy connection assembly 154 removably coupled to the first canopy assembly 150, and a junction box 158 coupled to the first canopy assembly 150. While not illustrated in FIG. 1, it will be appreciated that the junction box 158 includes one or more drivers (e.g., LED drivers) for powering the components of the first light fixture 108A as well as various electrical terminals and wiring for connecting the different components of the first light fixture 108A. While also not illustrated in FIG. 1, it will be appreciated that the first light fixture 108A can optionally also include a heat sink, a controller, one or more diffusers, and/or one or more other components.

The first canopy assembly 150 is generally configured to be partially disposed in and engage the desired surface (e.g., the ceiling, floor, or other surface) in the environment 104 in order to retain the first light fixture 108A in position in or on the desired surface in the environment 104. In this example, the first canopy assembly 150 includes a canopy plate 162, a collar 166 coupled to the canopy plate 162, and a cover plate 170 (which can be purely decorative) coupled to the canopy plate 162. While not explicitly illustrated herein, it will be appreciated that the canopy plate 162 is coupled to the junction box 158 via, for example, a plurality of fasteners 176. The canopy plate 162 has an annular shape and includes a first surface 178 and a second surface 182 opposite the first surface 178. When the first canopy assembly 150 engages the desired surface, the first surface 178 faces away from the desired surface and toward the environment 104, whereas the second surface 182 engages a portion of the desired surface as well as the junction box 158 (not shown). The collar 166, which in this example has an annular shape, has a first portion that is disposed in an opening 186 of the canopy plate 162, and a second portion that is disposed outside of the opening 186, such that the collar 166 extends outward from and of the first surface 178 of the canopy plate 162. Meanwhile, the cover plate 170 in this example also has an annular shape, with an opening 190 that is sized to receive a portion of the collar 166. In turn, the cover plate 170 is configured to be seated against the canopy plate 162 (and more particularly the first surface 178) such that the collar 166 also extends outward from and of the cover plate 170.

The first canopy connection assembly 154 is generally configured to mechanically and electrically connect the first light fixture 108A to any LED modules 112 coupled to the first light fixture 108A (and vice-versa). As best illustrated in FIG. 2, the first canopy connection assembly 154 in this example includes a base 200, electrical wiring 204, and a pair of connectors 208 coupled to the base 200. The base 200 is sized to be disposed within, and be surrounded by, the collar 166. Thus, in this example, the base 200 also has an annular shape. The electrical wiring 204 extends radially outwardly from the base 200 and helps to electrically connect the pair of connectors 208 (and any LED modules 112) to the junction box 158. The pair of connectors 208 extend outward from the base 200, with a first connector 208A extending outward along a first axis and a second connector 208B extending outward along a second axis parallel to the first axis, such that the second connector 208B is spaced from the first connector 208A. In turn, the first canopy connection assembly 154 also includes a recess 212 defined between the first connector 208A and the second connector 208B. As will be discussed in greater detail below, the recess 212 is sized to receive a portion of an LED module 112 directly coupled to the first light fixture 108A in order to mechanically and electrically connect the LED module 112 to the first light fixture 108A (and vice-versa).

In this example, the first canopy assembly 150 also includes a ring 174 removably coupled to the collar 166 in order to retain the other components of the first canopy assembly 150 and the components of the first canopy connection assembly 154 in place. In this example, the ring 174 is removably coupled to the collar 166 via a plurality of threads 216 formed on an inner surface of a rim 200 of the ring 174 and configured to threadably engage a plurality of threads (not shown) formed on an outer surface 228 of the second portion of the collar 166. In other examples, however, the ring 174 can be coupled to the collar 166 in a different manner and/or the ring 174 can be coupled to a different component. In any event, when the ring 174 is coupled to the collar 166, the pair of connectors 208 extend outward from and of the ring 174, such that the pair of connectors 208 are arranged to engage one of the LED modules 112 to mechanically and electrically connect the first light fixture 108A to that LED module 112.

Because the system 100 is a constant voltage system, and because the first canopy connection assembly 154 is configured to provide both a mechanical and electrical connection, the first canopy connection assembly 154 has a positive side (with positive polarity) and a negative side (with negative polarity). As illustrated in FIG. 3, the first canopy connection assembly 154 in this example is approximately divided in half, with a first, positive half 232 that is marked with a positive indicator 234, and a second, negative half 236 that is electrically isolated from the first, positive half 232. The first, positive half 232 includes the first connector 208A and the second, negative half 236 includes the second connector 208B. In other examples, however, the first half 232 can have a negative polarity and the second half 236 can have a positive polarity.

Figure 4:
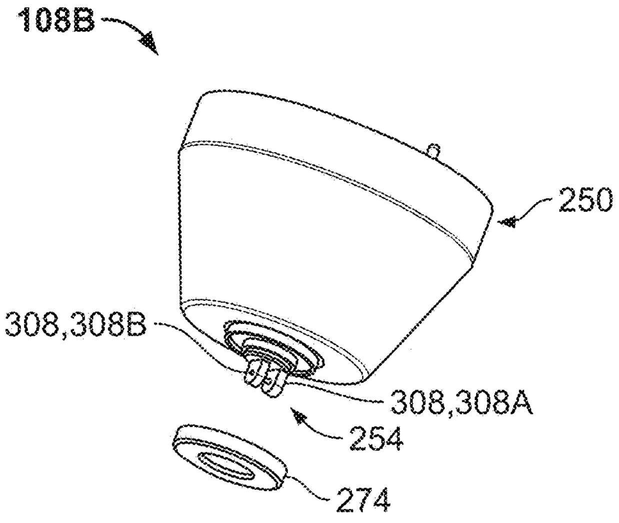
FIG. 4 is a perspective view of a second one of the light fixtures shown in FIG. 1.
Figure 5:
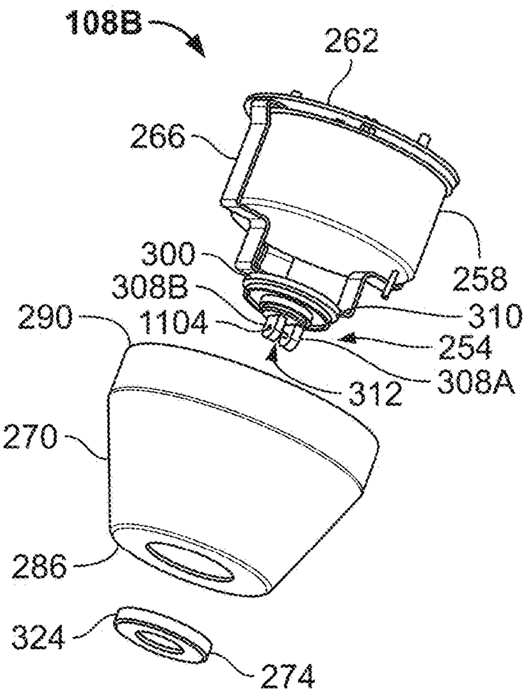
FIG. 5 is a first exploded view of the second light fixture.
Figure 6:
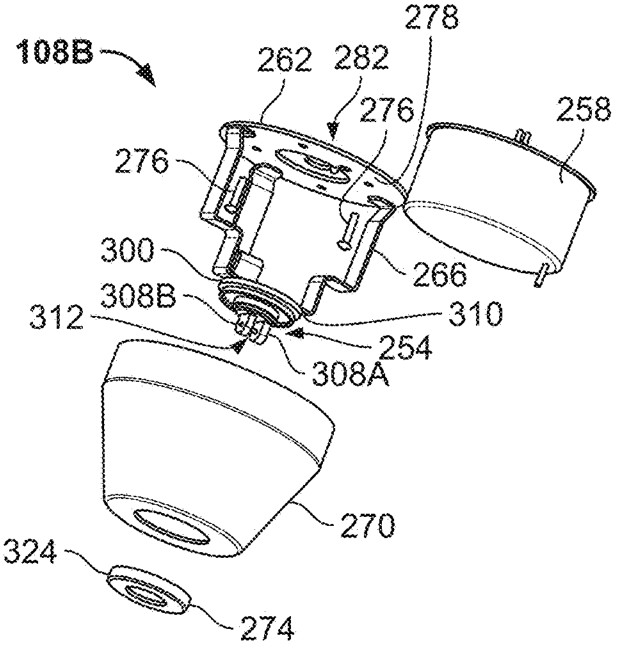
FIG. 6 is a second exploded view of the second light fixture.

Like the first light fixture 108A, the second light fixture 108B is generally configured to be installed in or on the desired surface such that a portion of the second light fixture 108B protrudes outward (downward, upward, leftward, or rightward, depending upon the orientation) and into the environment 104. As illustrated in FIGS. 1, 4, and 5, and much like the first light fixture 108A, the second light fixture 108B generally includes a second canopy assembly 250, a second canopy connection assembly 254 removably coupled to the second canopy assembly 250, and, though not shown, a junction box, e.g., the junction box 158, coupled to the second canopy assembly 250. However, unlike the first light fixture 108A, the second light fixture 108B also includes a transformer 258 configured to transfer electrical energy from the junction box to the second canopy connection assembly 254 (and to any LED modules 112 coupled to the second light fixture 108B). While not illustrated in FIGS. 1, 4, and 5, it will be appreciated that the second light fixture 108B can optionally also include a heat sink, a controller, one or more diffusers, and/or one or more other components.

Like the first canopy assembly 150, the second canopy assembly 250 is generally configured to be partially disposed in and engage the desired surface (e.g., the ceiling, floor, or other surface) in the environment 104 in order to retain the second light fixture 108B in position in or on the desired surface in the environment 104. However, the second canopy assembly 250 differs structurally from the first canopy assembly 150. In this example, the second canopy assembly 250 includes a canopy plate 262, a frame 266 coupled to the canopy plate 262, and a canopy housing 270. While not explicitly illustrated herein, it will be appreciated that the canopy plate 262 is coupled to the junction box via, for example, a plurality of fasteners 276 (shown in FIG. 6). The canopy plate 262 has an annular shape and includes a first surface 278 and a second surface 282 opposite the first surface 278. When the second canopy assembly 250 engages the ceiling (or other desired surface), the first surface 278 faces away from the desired surface and toward the environment 104, whereas the second surface 282 engages a portion of the desired surface as well as the junction box. Meanwhile, the frame 266 is coupled to and extends outward from the first surface 278. The frame 266 is generally sized so as to receive and retain the transformer 258 therein. The canopy housing 270, which can also be referred to as a cover plate, is sized to receive both the canopy plate 262 and the frame 266, such that when the second canopy assembly 250 is installed, neither the canopy plate 262 nor the frame 266 is visible (as illustrated in FIG. 4). In this example, the canopy housing 270 has a frustoconical shape defined by a first end 286 and a second end 290 opposite the first end 286, though other shapes are possible as well.

Like the first canopy connection assembly 154, the second canopy connection assembly 254 is generally configured to mechanically and electrically connect the second light fixture 108B to any LED modules 112 coupled to the second light fixture 108B (and vice-versa). The second canopy connection assembly 254 is also similar structurally to the first canopy connection assembly 154, in that the second canopy connection assembly 254 includes a base 300, electrical wiring (not shown), and a pair of connectors 308 coupled to the base 300. The base 300 is similar to the base 200, but the base 300 is coupled (in any known manner) to an end 310 of the frame 266 such that the canopy plate 262, the frame 266, and the base 300 (and the pair of connectors 308 coupled thereto) form a unitary structure. While not shown, it will be appreciated that the electrical wiring, meanwhile, electrically connects the transformer 258 with the pair of connectors 308 (and vice-versa). Like the pair of connectors 208, the pair of connectors 308 extend outward from the base 300, with a first connector 308A extending outward along a first axis and a second connector 308B extending outward along a second axis parallel to the first axis, such that the second connector 308B is spaced from the first connector 308A. In turn, the second canopy connection assembly 254 also includes a recess 312 defined between the first connector 308A and the second connector 308B. As will be discussed in greater detail below, the recess 312 is sized to receive a portion of an LED module 112 directly coupled to the second light fixture 108B in order to mechanically and electrically connect the LED module 112 to the second light fixture 108B (and vice-versa).

In this example, the second canopy assembly 250 also includes a ring 274. The ring 274 is similar to, but slightly smaller than, the ring 174, and is removably coupled to the base 300 at the first end 286 of the canopy housing 270 in order to retain the components of the second light fixture 108B in place. In this example, the ring 274 is removably coupled to the base 300 via a plurality of threads (not shown) formed on an inner surface of a rim 324 of the ring 274 and configured to threadably engage a plurality of threads (not shown) formed on an outer surface of the base 300. In other examples, however, the ring 274 can be coupled to the base 300 in a different manner and/or the ring 274 can be coupled to a different component. In any event, when the ring 274 is so coupled to the base 300, the transformer 258, the canopy plate 262, and the frame 266 are disposed within the canopy housing 270, while the pair of connectors 308 extend outward from and of the ring 274. In turn, the pair of connectors 308 are arranged to engage one of the LED modules 112 to mechanically and electrically connect the second light fixture 108B to that LED module 112.

Because the system 100 is a constant voltage system, and because the first canopy connection assembly 254 is configured to provide both a mechanical and electrical connection, the first canopy connection assembly 254 has a positive side (with positive polarity) and a negative side (with negative polarity). While not explicitly illustrated herein, the first canopy connection assembly 254 in this example is approximately divided in half, with a first, positive half that is marked with a positive indicator (e.g., like the positive indicator 234), and a second, negative half electrically isolated from the first, positive half. The first, positive half includes the first connector 308A and the second, negative half includes the second connector 308B. In other examples, however, the first half can have a negative polarity and the second half can have a positive polarity.

Figure 7:
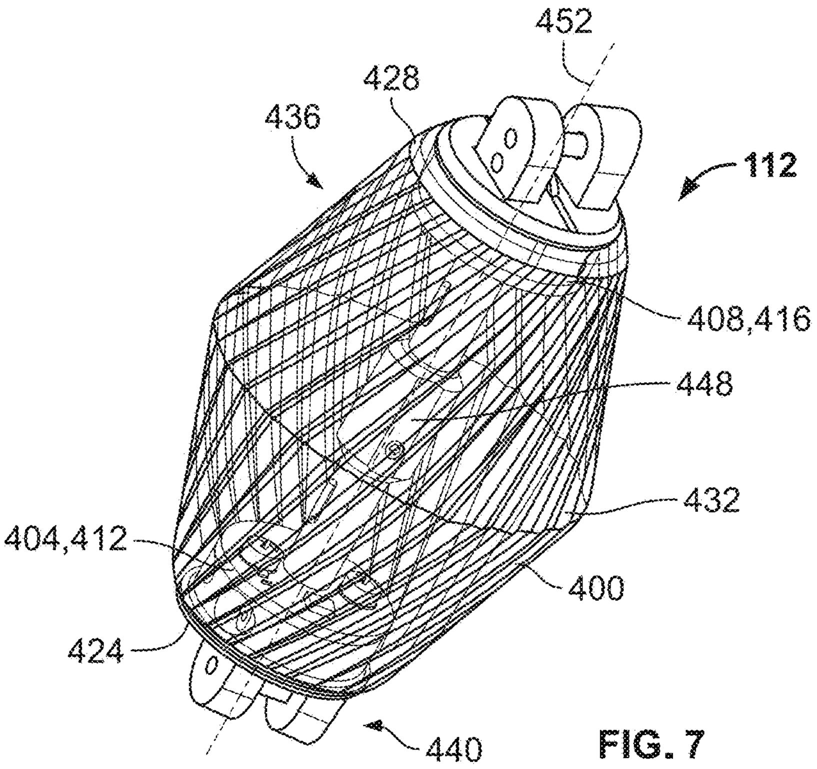
FIG. 7 is a perspective view of one of the LED modules, showing first and second connector sub-assemblies for mechanically and electrically connecting the LED module to one or more other LED modules and/or one of the light fixtures.
Figure 8:
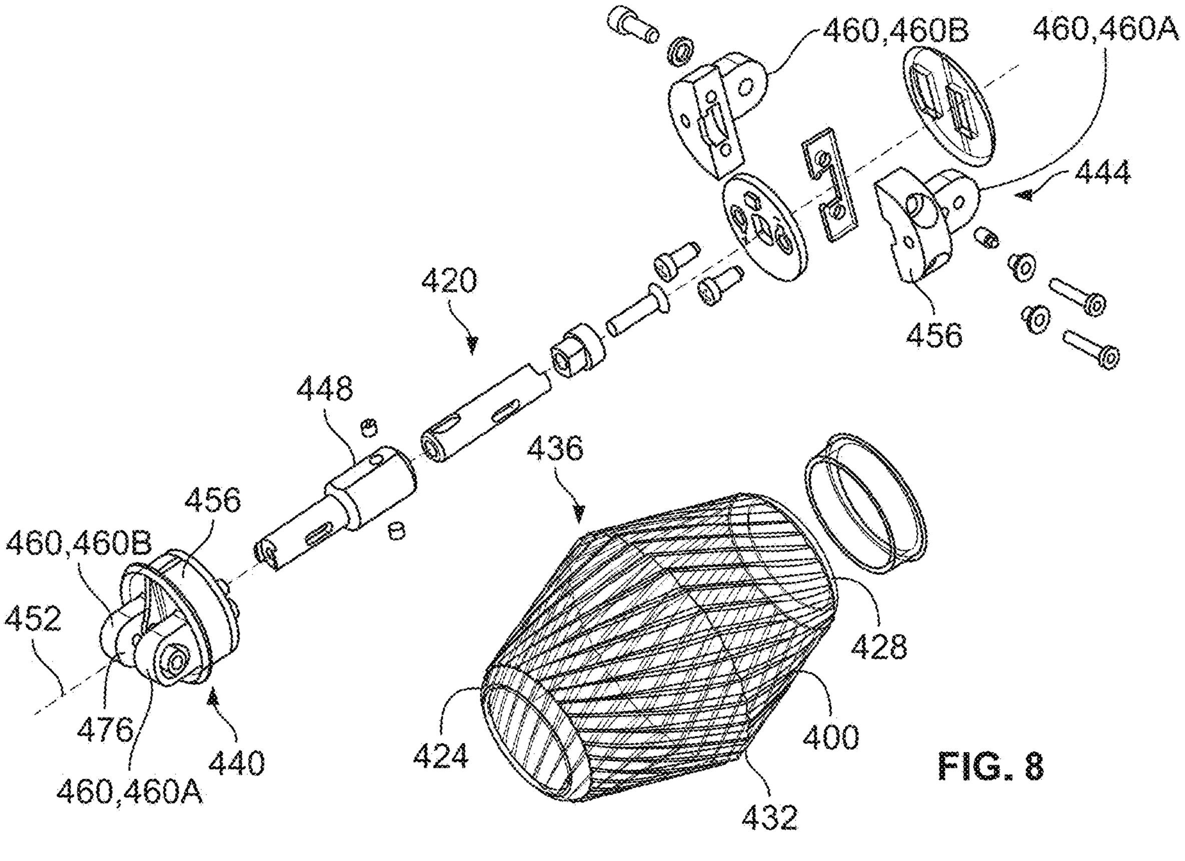
FIG. 8 is an exploded view of the LED module of FIG. 7.

FIGS. 7 and 8 illustrate one of the LED modules 112, which at least in this example are identical to one another. Thus, in this example, each LED module 112 in the recessed lighting system 100 includes a housing 400, a first printed circuit board (PCB) 404, a second PCB 408, a first LED 412 coupled to the first PCB 404 and configured to emit light to provide illumination to the environment 104, a second LED 416 coupled to the second PCB 408 and configured to emit light to provide illumination to the environment 104, and a connector assembly 420 that is removably coupled to and extends through the housing 400 and allows the LED module 112 to be mechanically and electrically connected to (i) both light fixtures 108, (ii) one of the light fixtures 108 and another LED module 112, (iii) only one of the light fixtures 108, (iv) two LED modules 112 (one at each end), or (v) only one LED module 112. In other examples, however, one or more of the LED modules 112 can vary from the LED module 112 illustrated in FIGS. 7 and 8. As an example, one or more of the LED modules 112 can instead include more or less PCBs (e.g., only a single PCB) and more or less LEDs (e.g., only a single LED).

The housing 400 generally serves to house the first PCB 404, the second PCB 408, the first LED 412, the second LED 416, and at least a portion of the connector assembly 420 of each LED module 112. In this example, the housing 400 has a hexagonal shape that includes a first open end 424, a second open end 428 opposite the first open end, and a central portion 432 centrally disposed between the first end 424 and the second end 428. In other examples, however, the housing 400 can have a different shape. As an example, the housing 400 can instead have a conical, spherical, pyramidal, cylindrical, or cubical shape. In this example, the housing 400 is made of a material such as glass (e.g., crystal) that enhances the aesthetic appeal of the respective LED module 112. In other examples, the housing 400 can instead be made of one or more different materials (e.g., stainless steel, a natural stone such as Alabaster, or a plastic material such as Acrylic). As illustrated in FIG. 7, the housing 400 preferably includes a decorative pattern 436 that further enhances the aesthetic appeal of the respective LED module 112. In this example, the decorative pattern 436 includes a plurality of decorative features in the form of a plurality of lines circumferentially arranged on an exterior surface of the housing 400. In other examples, the plurality of decorative features can vary in shape and/or size. For example, the plurality of decorative features can have a circular, triangular, rectangular, and/or diamond shape.

The connector assembly 420 is removably coupled to the housing 400 and generally includes a first connector sub-assembly 440, a second connector sub-assembly 444, and a sleeve 448. The first connector sub-assembly 440 is configured to mechanically and electrically connect one end of the respective LED module 112 to one of the light fixtures 108 or to another LED module 112 adjacent thereto. In this example, the first connector sub-assembly 440 extends along a central longitudinal axis 452 of the housing 400 such that the first connector sub-assembly extends through the housing 400 and at least partially outside of the housing 400 via the first open end 424 of the housing 400. Similarly, the second connector sub-assembly 444 is configured to mechanically and electrically connect the other end of the respective LED module 112 to one of the light fixtures 108 or to another LED module 112 adjacent thereto. In this example, the second connector sub-assembly 444 also extends along the central longitudinal axis 452 of the housing 400 (the two sub-assemblies 440, 444 are thus co-axially arranged), but so that the second connector sub-assembly 444 extends through the housing 400 and at least partially outside of the housing 400 via the second open end 428 of the housing 400. Meanwhile, the sleeve 448 serves to removably connect the second connector sub-assembly 444 to the first connector sub-assembly 440 (and vice-versa). In this example, the sleeve 448 also extends along the central longitudinal axis 452 of the housing 400 and receives both the first and second connector sub-assemblies 440, 444 such that the sleeve 448 substantially surrounds (and substantially conceals) the first and second connector sub-assemblies 440, 444, as illustrated in FIG. 7. Further, at least in this example, the sleeve 448 is made of a material (e.g., polished nickel) that acts to reflect light emitted by the first and second LEDs 412, 416 and redirect and/or scatter that light to various portions within the environment 104.

As illustrated in FIGS. 7 and 8, each first connector sub-assembly 440 is similar to the first canopy connection assembly 154 discussed above. Like the first canopy connection assembly 154, each first connector sub-assembly 440 in this example includes a base 456 and a pair of connectors 460 coupled to the base 456. As also illustrated in FIGS. 7 and 8, the second connector sub-assembly 444 in each LED module 112 is identical to the first connector sub-assembly 440 in that LED module 112, such that each second connector sub-assembly 444 also includes a base 456 and a pair of connectors 460. In other examples, however, the second connector sub-assembly 444 can vary from the first connector sub-assembly 440 of the respective LED module 112, and/or the first and/or second connector sub-assemblies 440 of LED modules 112 can vary from one another. As an example, the first connector sub-assembly 440 or the second connector sub-assembly 444 can include an end cap instead of the base 456 and the connectors 460. It will be appreciated that in such an example, the end cap serves to close the second open end 428 of the housing 400 and does not permit a mechanical and electrical connection between the second open end 428 and another LED module 112 or one of the light fixtures 108.

In this example, the pair of connectors 460 extend outward from the base 456, which has an annular shape, with a first connector 460A extending outward along a first axis and a second connector 460B extending outward along a second axis parallel to the first axis, such that the second connector 460B is spaced from the first connector 460A. In turn, each first connector sub-assembly 440 also includes a recess 476 defined between the first connector 460A and the second connector 460B. As will be discussed in greater detail below, the recess 476 is sized to receive a portion of one of the light fixtures 108 or a portion of another LED module 112 adjacent thereto, depending on whether the first connector sub-assembly 440 is mechanically and electrically connected to one of the light fixtures 108 or to another LED module 112 adjacent thereto.

The first PCB 404 and the second PCB 408 are generally configured to support the first LED 412 and the second LED 416, respectively, within the housing 400. To this end, the first PCB 404 is preferably coupled to a portion of the first connector sub-assembly 440 and the second PCB 408 is preferably coupled to a portion of the second connector sub-assembly 444. As best illustrated in FIG. 7, in this example the first PCB 404 has an annular shape and is positioned against a portion of the base 456 of the first connector sub-assembly 440 at a position within the housing 400 adjacent the first end 424, whereas the second PCB 408 has an annular shape and is positioned against a portion of the base 456 of the second connector sub-assembly 444 within the housing 400 adjacent the second end 428. In turn, at least in this example, the first PCB 404 and the second PCB 408 face one another within the housing 400. Moreover, by virtue of this arrangement, the first LED 412, which is seated on the first PCB 404, is also positioned within the housing 400 adjacent the first end 424, and the second LED 416, which is seated on the second PCB 408, is also positioned within the housing 400 adjacent the second end 428. In turn, at least in this example, the first LED 412 and the second LED 416 also face one another within the housing 400, with the first LED 412 configured to emit light in an upward direction, toward the second end 428, and the second LED 412 configured to emit light in a downward direction, toward the first end 424. In other examples, however, the first PCB 404 and the second PCB 408 (and in turn the first LED 412 and the second LED 416, respectively) can be positioned against different components (e.g., of the first and second connector sub-assemblies 440, 444, respectively).

Because the system 100 is a constant voltage system, and because the first connector sub-assembly 440 and the second connector sub-assembly 444 are configured to provide both a mechanical and electrical connection, each of the first connector sub-assembly 440 and the second connector sub-assembly 444 has a positive side (with positive polarity) and a negative side (with negative polarity). While not explicitly illustrated herein, each of the first connector sub-assembly 440 and the second connector sub-assembly 444 in this example is approximately divided in half, with a first, positive half that is marked with a positive indicator (e.g., like the positive indicator 234), and a second, negative half. In this example, the first, positive half includes the first connector 460A and the second, negative half includes the second connector 460B. In other examples, however, the first half can have a negative polarity and the second half can have a positive polarity.

As discussed above, the plurality of LED modules 112 can be selectively coupled to one another and to any of the plurality of light fixtures 108 in order to customize or adjust the plurality of light fixtures 108 (and, more generally, the recessed lighting system 100) as desired. Thus, in this example, when the first light fixture 108A and the second light fixture 108B are installed in or on the desired surface in the environment, the plurality of LED modules 112 can be selectively coupled to one another and to either or both of the first light fixture 108A and the second light fixture 108B.

Figure 9:
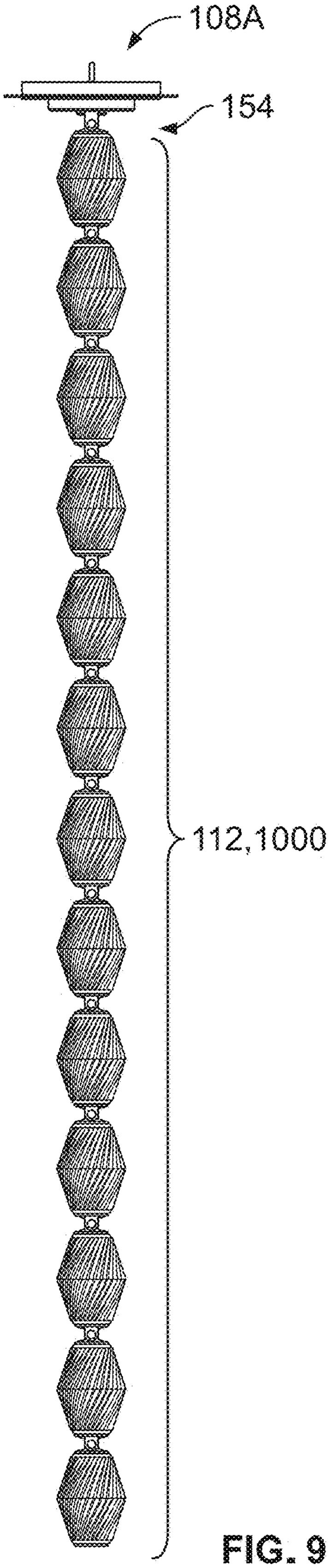
FIG. 9 illustrates a plurality of LED modules coupled to the first light fixture.
Figure 10:
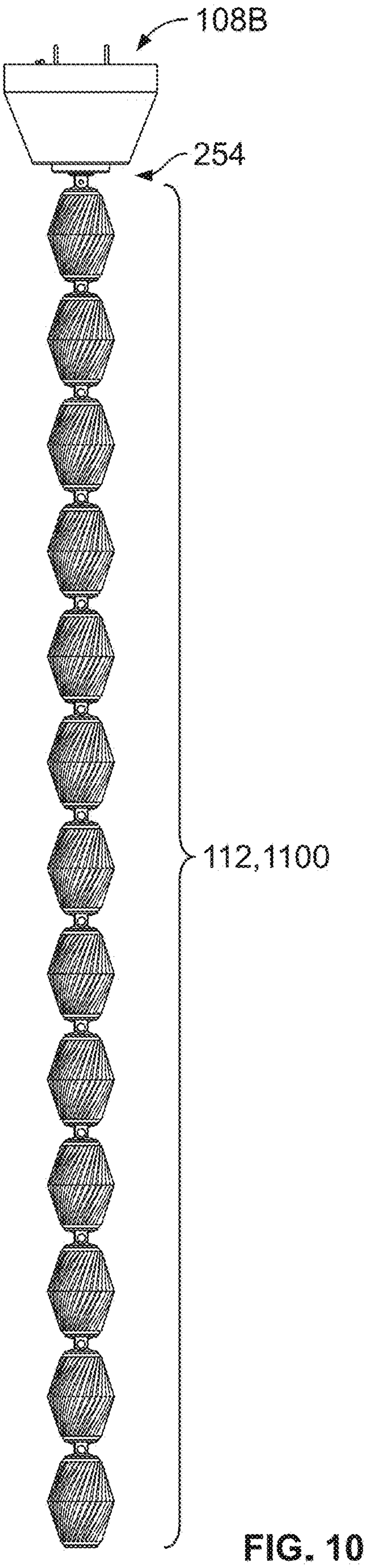
FIG. 10 illustrates a plurality of LED modules coupled to the second light fixture.

FIG. 9, for example, illustrates thirteen LED modules 112 coupled to the first light fixture 108A and to one another such that the LED modules 112 form a string 1000 of LED modules that hangs from the first light fixture 108A (straight down, at least in this example). FIG. 10, meanwhile, illustrates thirteen LED modules 112 coupled to the second light fixture 108B and to one another such that the LED modules 112 form a string 1100 of LED modules that hangs from the second light fixture 108B (straight down, at least in this example). In other examples, however, the string 1000 or the string 1100 can include a different number of LED modules 112.

In order to mechanically and electrically connect one of the LED modules 112 (the top LED module 112 in FIG. 9) to the first light fixture 108A, the first canopy connection assembly 154 of the first light fixture 108A is directly coupled to the connector assembly 420 of that LED module 112, as best illustrated in FIG. 9. In particular, the first light fixture 108A and the respective LED module 112 are positioned so that (i) the positive side of the first canopy connection assembly 154 is aligned (vertically) with the positive side of the respective first or second sub-connector sub-assembly 440, 444, and (ii) the negative side of the first canopy connection assembly 154 is aligned (vertically) with the negative side of the respective first or second connector sub-assembly 440, 444. Next, one of the connectors 208A, 208B is disposed in the recess 476 of the respective first or second connector sub-assembly 440, 444, and one of the connectors 460A, 460B is disposed in the recess 212 of the first canopy connection assembly 154. This arrangement causes the other of the connectors 208A, 208B to be disposed outside of the recess 476 but in engagement with one of the connectors 460A, 460B. In turn, apertures 1004 formed through each of the connectors 208A, 208B, 460A, and 460B are (horizontally) aligned with one another. The connectors 208A, 208B, 460A, and 460B can be removably secured in this position by inserting one or more fasteners in the apertures 1004. In this example, the connectors 208A, 208B, 460A, and 460B can be removably secured in this position by inserting two Allen head screws in the apertures 1004. In other examples, however, different fasteners can be used to removably secure the connectors 208A, 208B, 460A, and 460B in position. In any event, by virtue of this mechanical and electrical connection between the first light fixture 108A and the respective LED module 112, the one or more drivers of the junction box 158 of the first light fixture 108A can provide power to both the first and second LEDs 412, 416 of the respective LED module 112 directly coupled thereto, which in turn emit light, as well as to the first and second LEDs 412, 416 of any LED modules 112 part of the string 1000 of LED modules that hangs from the first light fixture 108A.

Likewise, in order to mechanically and electrically connect one of the LED modules 112 (the top LED module 112 in FIG. 10) to the second light fixture 108B, the second canopy connection assembly 254 of the second light fixture 108B is directly coupled to the connector assembly 420 of that LED module 112, as illustrated in FIG. 10. In particular, the second light fixture 108B and the respective LED module 112 are positioned so that (i) the positive side of the second canopy connection assembly 254 is (vertically) aligned with the positive side of the respective first or second connector sub-assembly 440, 444, and (ii) the negative side of the second canopy connection assembly 254 is (vertically) aligned with the negative side of the respective first or second connector sub-assembly 440, 444. Next, one of the connectors 308A, 308B is disposed in the recess 476 of the respective first or second connector sub-assembly 440, 444, and one of the connectors 460A, 460B is disposed in the recess 312 of the second canopy connection assembly 254. This arrangement causes the other of the connectors 308A, 308B to be disposed outside of the recess 476 but in engagement with one of the connectors 460A, 460B. In turn, the apertures 1004 formed through each of the connectors 460A, 460B and apertures 1104 formed through each of the connectors 308A, 308B are (horizontally) aligned with one another. The connectors 308A, 308B, 460A, and 460B can be removably secured in this position by inserting one or more fasteners in the apertures 1004, 1104. In this example, the connectors 308A, 308B, 460A, and 460B can be removably secured in this position by inserting two Allen head screws in the apertures 1004, 1104. In other examples, however, different fasteners can be used to removably secure the connectors 308A, 308B, 460A, and 460B in position. In any event, by virtue of this mechanical and electrical connection between the second light fixture 108B and the respective LED module 112, the one or more drivers of the junction box of the second light fixture 108B can provide power to both the first and second LEDs 412, 416 of the respective LED module 112 directly coupled thereto, which in turn emit light, as well as to the first and second LEDs 412, 416 of any LED modules 112 part of the string 1100 of LED modules that hangs from the second light fixture 108B.

Figure 11:
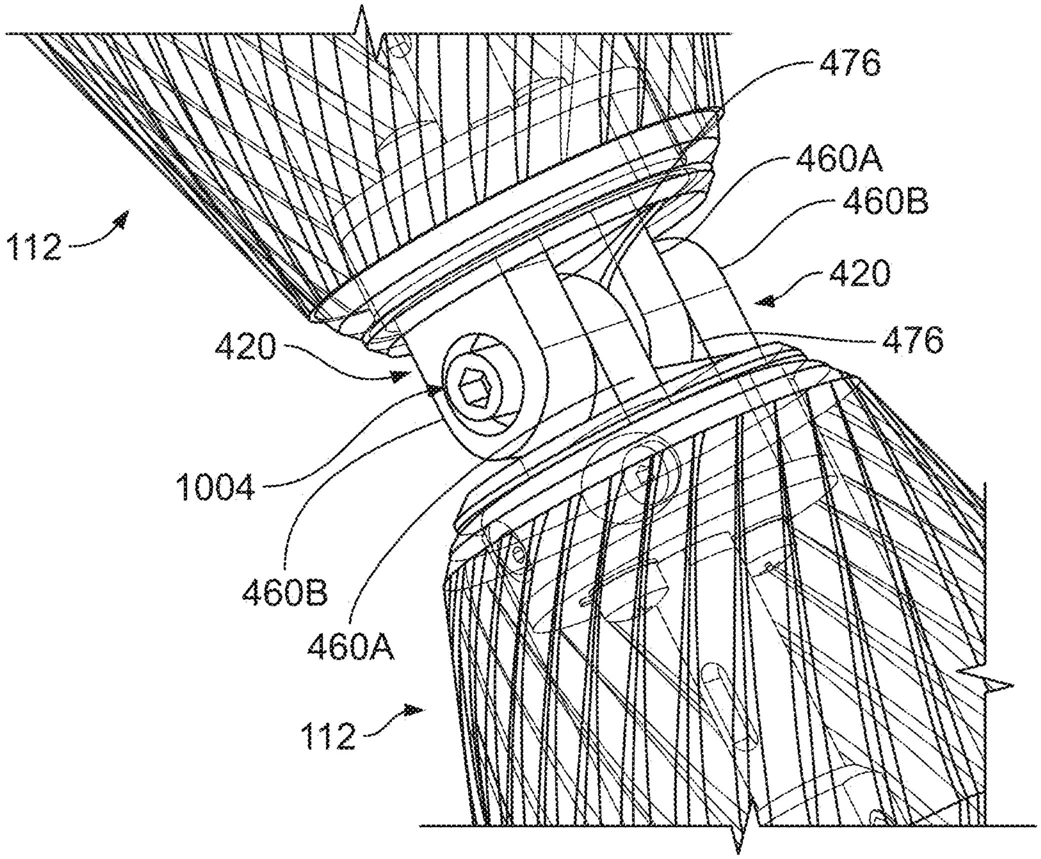
FIG. 11 is a close-up view showing a first LED module mechanically and electrically connected to a second LED module.

In order to mechanically and electrically connect a first one of the LED modules 112 (e.g., the top LED module 112 in FIG. 9) to a second one of the LED modules 112 (e.g., the second from the top LED module 112 in FIG. 9) adjacent to the first LED module 112, the connector assembly 420 of the second LED module 112 is directly coupled to the connector assembly 420 of the first LED module 112, as best illustrated in FIG. 11. First, the two LED modules 112 are positioned so that (i) the positive side of the respective first or second connector sub-assembly 440, 444 of the first LED module 112 is (vertically) aligned with the positive side of the respective first or second connector sub-assembly 440, 444 of the second LED module 112, and (ii) the negative side of the respective first or second connector sub-assembly 440, 444 of the first LED module 112 is (vertically) aligned with the negative side of the respective first or second connector sub-assembly 440, 444 of the second LED module 112. Next, one of the connectors 460A, 460B of the respective first or second connector sub-assembly 440, 444 of the first LED module 112 is disposed in the recess 476 of the respective first or second connector sub-assembly 440, 444 of the second LED module 112, and one of the connectors 460A, 460B of the respective first or second connector sub-assembly 440, 444 of the second LED module 112 is disposed in the recess 476 of the respective first or second connector sub-assembly 440, 444 of the first LED module 112, as illustrated in FIG. 11. In turn, the apertures 1004 formed through the connectors 460A, 460B of the first LED module 112 and the apertures 1004 formed through the connectors 460A, 460B of the second LED module 112 are (horizontally) aligned with one another. The connectors 460A, 460B can be removably secured in this position by inserting one or more fasteners in the apertures 1004. In this example, the connectors 460A, 460B can be removably secured in this position by inserting two Allen head screws in the apertures 1004. In other examples, however, different fasteners can be used to removably secure the connectors 460A, 460B in position. In any event, by virtue of this mechanical and electrical connection between the first and second LED modules 112, power provided by the one or more drivers of the first light fixture 108A or the second light fixture 108B can be supplied to the first and second LEDs 412, 416 of both the first and second LED modules 112, which in turn emit light.

This process of mechanically and electrically connecting LED modules 112 together can be repeated any number of times as needed to form the string 1000, the string 1100, or a different string, though generally each string should be limited to a length of 20 feet (e.g., 80 LED modules 112) due to weight and electrical limitations (longer strings will need to be powered at two ceiling points as discussed below). In turn, the power provided by the one or more drivers of the first light fixture 108A or the second light fixture 108B can also be supplied to the first and second LEDs 412, 416 of any other LED modules 112 part of the string 1000, the string 1100, or any strings of LED modules 112. The first and second LEDs 412, 416 of these LED modules 112 will likewise emit light.

Figure 12:
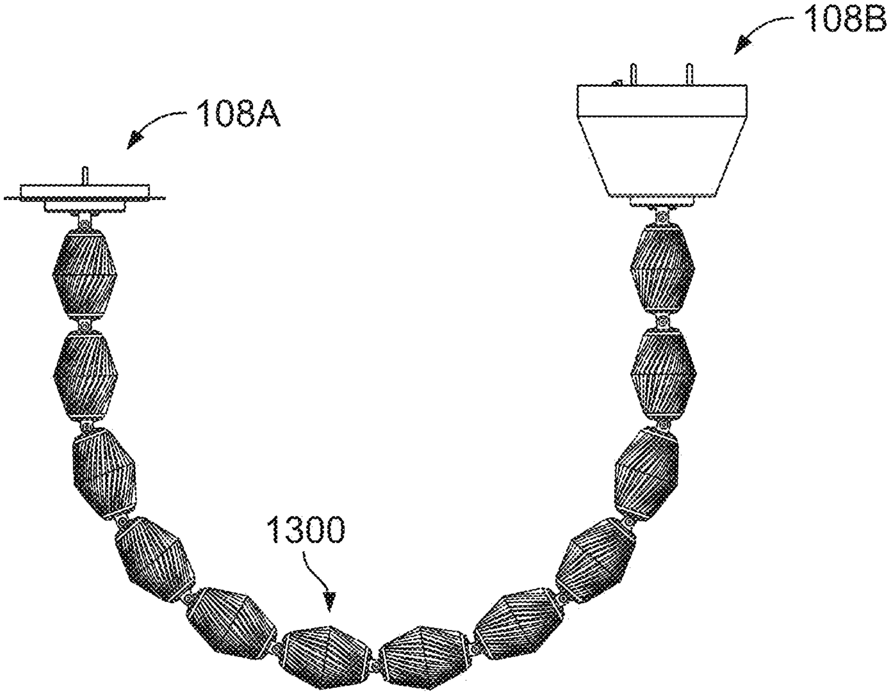
FIG. 12 illustrates a plurality of LED modules coupled to both the first light fixture and the second light fixture.
Figure 13:
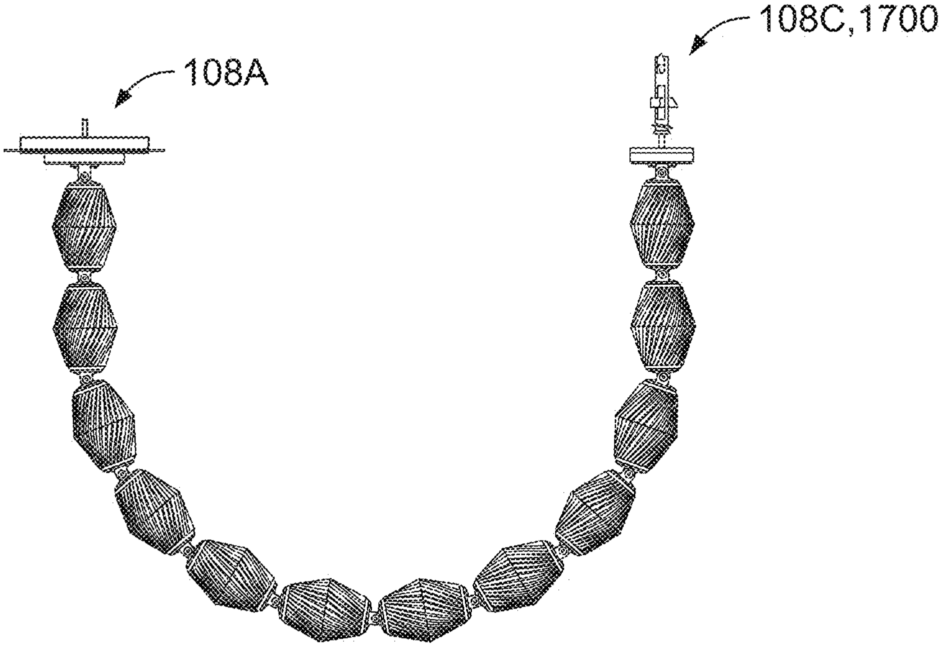
FIG. 13 illustrates a plurality of LED modules coupled to both the first light fixture and a third light fixture.

It will be appreciated that the lighting system 100 (and more particularly the first and second light fixtures 108A, 108B) can be customized by adjusting the components of the lighting system 100 in a number of different ways, as desired. Several examples are discussed below. First, by loosening the fasteners discussed above, the LED modules 112 (particularly the first and second connector sub-assemblies 440, 444) can be rotated (up to 180 degrees) relative to the first light fixture 108A or the second light fixture 108B in order to, for example, adjust the direction or orientation of the LED modules 112. Second, one or more of the LED modules 112 can be removed from the string 1000, the string 1100, or another string in a similar manner (albeit the steps will be performed in reverse), which can be done in order to, for example, reduce the length of the string 1000, the string 1100, or other string. Third, additional LED modules 112 can be added to the string 1000, the string 1100, or other string in a similar manner in order to, for example, increase the length of the string 1000, the string 1100, or other string. Fourth, LED modules 112 coupled to one of the light fixtures 108 can be directly coupled to (or decoupled from) LED modules 112 coupled to another one of the light fixtures 108. As illustrated in, for example, FIG. 12, the LED modules 112 coupled to the first light fixture 108A can be directly coupled to the LED modules 112 coupled to the second light fixture 108B, thereby forming a swag 1300 of LED modules 112 that hang from and between the first light fixture 108A and the second light fixture 108B. As another example, the LED modules 112 coupled to the first light fixture 108A can be directly coupled to (or decoupled from) a third light fixture 108C in the form of a stand-off light fixture 1700 that is structurally similar to the components shown in FIG. 2 and installed in or on a desired surface in the environment 104, as illustrated in FIG. 13.

When, for example, it is desirable to directly couple the LED modules 112 coupled to the first light fixture 108A to the LED modules 112 coupled to the second light fixture 108B, it may necessary for the recessed lighting system 100 to also include a hub connector 1500 that mechanically connects but electrically isolates the LED modules 112 coupled to the first light fixture 108A and the LED modules 112 coupled to the second light fixture 108B. More particularly, it may be necessary to include the hub connector 1500 in order to ensure that the recessed lighting system 100 maintains a specific class rating. For example, it may be necessary to include the hub connector 1500 in order to ensure that the recessed lighting system 100 maintains a class 2 rating, which limits each light fixture 108 to 100 W, i.e., a length of 20 feet.

Figure 14:
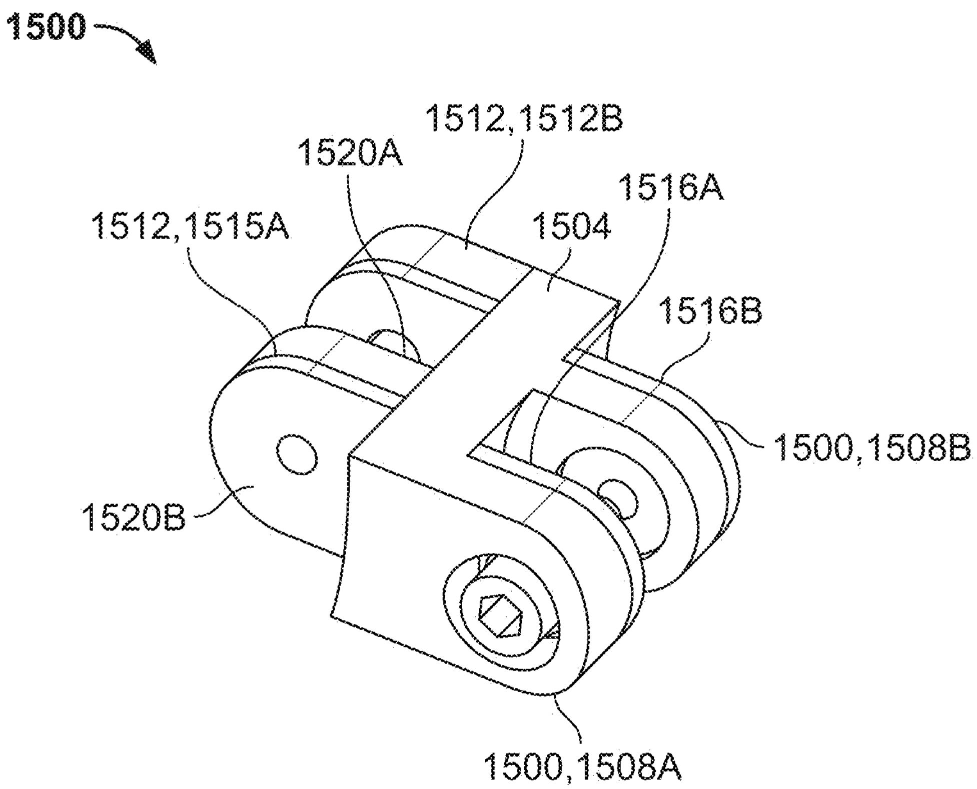
FIG. 14 is a perspective view of a hub connector configured to mechanically connect but electrically isolate a first LED module and a second LED module.
Figure 15:
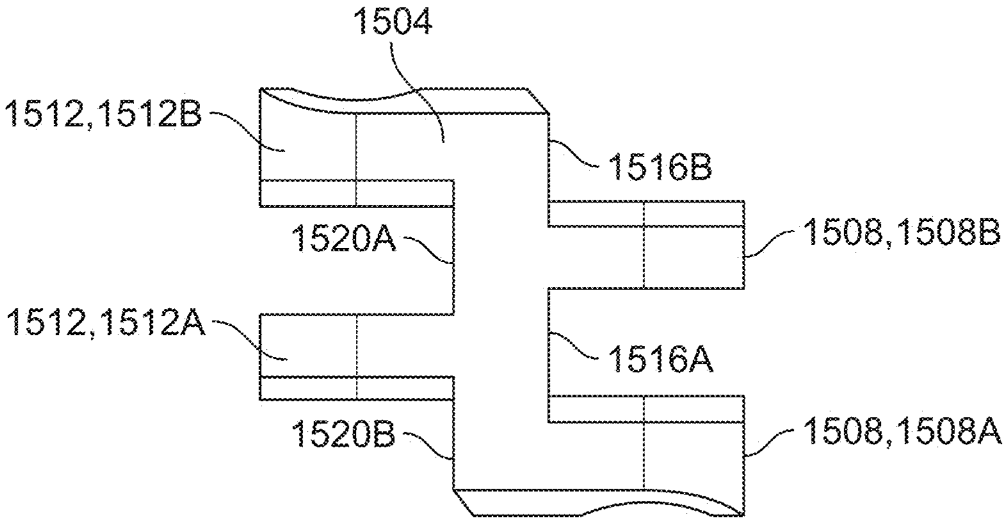
FIG. 15 is a top view of the hub connector of FIG. 14.

As illustrated in FIGS. 14 and 15, the hub connector 1500 in this example generally includes a base 1504, a first pair of connectors 1508 coupled to the base 1504, and a second pair of connectors 1512 coupled to the base 1504. The first pair of connectors 1508 extend outward from the base 1504 in a first direction, with a first connector 1508A extending outward along a first axis and a second connector 1508B extending outward along a second axis parallel to the first axis, such that the second connector 1508B is spaced from the first connector 1508A. In turn, the hub connector 1500 also includes a first pair of recesses-a first recess 1516A defined between the first and second connectors 1508A, 1508B, and a second recess 1516B defined by the base 1504 and the second connector 1508B. The second pair of connectors 1512 also extend outward from the base, but in a second direction opposite the first direction, with a first connector 1512A extending outward along a first axis and a second connector 1512B extending outward along a second axis parallel to the first axis, such that the second connector 1512B is spaced from the first connector 1512A. In turn, the hub connector 1500 also includes a second pair of recesses-a first recess 1520A defined between the first and second connectors 1512A, 1512B, and a second recess 1520B defined by the base 1504 and the second connector 1512B.

Figure 16:
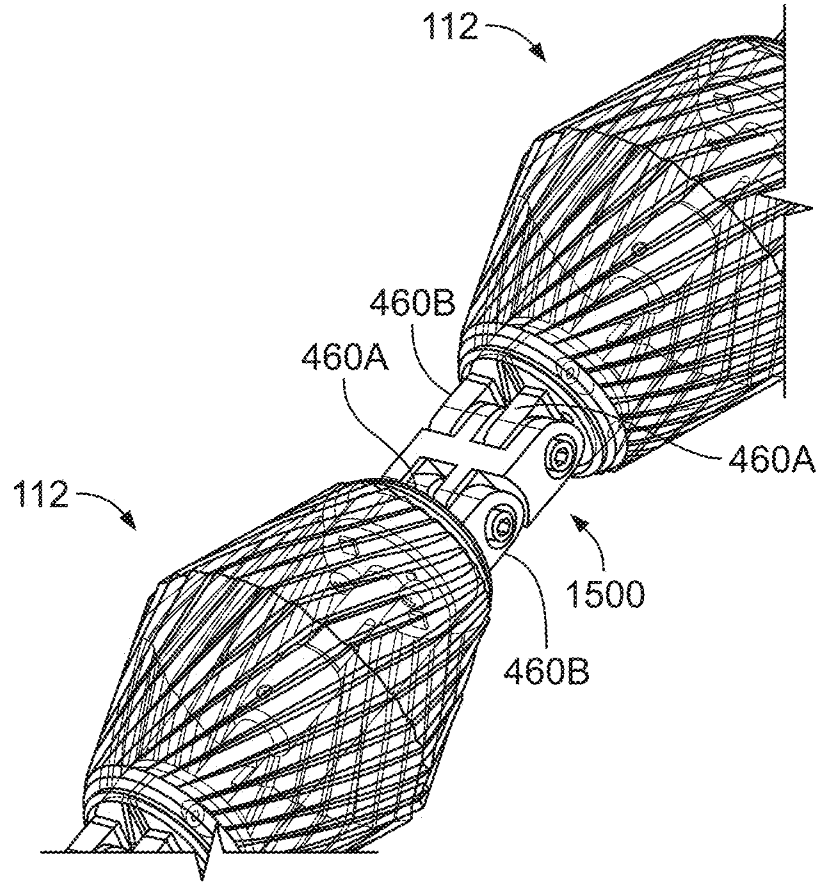
FIG. 16 illustrates the hub connector of FIG. 14 mechanically connecting a first LED module and a second LED module.

In order to form the swag 1300 using the hub connector 1500, the first pair of connectors 1508 is directly coupled to one of the LED modules 112 coupled to the first light fixture 108A and the second pair of connectors 1512 is directly coupled to one of the LED modules 112 coupled to the second light fixture 108B, as illustrated in FIG. 16. First, the hub connector 1500 is positioned between the two LED modules 112 (coupled to the different light fixtures 108A, 108*b*, respectively) to be mechanically connected to one another. Next, the connectors 460A, 460B of one of the LED modules 112 are disposed in the recesses 1516A, 1516B, respectively, of the hub connector 1500, while the connectors 460A, 460B of the other LED module 112 are disposed in the recesses 1520A, 1520B, respectively, of the hub connector 1500. At the same time, one of the connectors 508A, 508B is disposed in the recess 476 of the one LED module 112, and one of the connectors 512A, 512B is disposed in the recess 476 of the other LED module 112. In turn, the connectors 460A, 460B of both LED modules 112 and the connectors 508A, 508B, 512A, 512B of the hub connector 1500 can be removably secured in this position by inserting one or more fasteners therethrough, just as described above. In this manner, the hub connector 1500 is mechanically connected to both LED modules 112, and, therefore, serves to mechanically connect the LED modules 112 coupled to the first light fixture 108A and the LED modules 112 coupled to the second light fixture 108B. At the same time, while the hub connector 1500 is electrically connected to both LED modules 112, the structure of the hub connector 1500 serves to isolate the two electrical connections from one another, thereby electrically isolating the LED modules 112 coupled to the first light fixture 108A from the LED modules 112 coupled to the second light fixture 108B (and vice-versa). Accordingly, the one or more drivers of the junction box 158 of the first light fixture 108A can provide power to the first and second LEDs 412, 416 of the LED modules 112 coupled thereto, which in turn emit light, and the one or more drivers of the junction box of the second light fixture 108B can provide power to the first and second LEDs 412, 416 of the LED modules 112 coupled thereto, which likewise in turn emit light.

On the other hand, when it is desirable to directly couple the LED modules 112 coupled to the first light fixture 108 to the LED modules 112 coupled to the third light fixture 108C or another stand-off fixture, it is not necessary to employ the hub connector 1500 between the two different sets of LED modules 112. It will be appreciated that the hub connector 1500 is not necessary because the third light fixture 108C does not include any drivers (or other power source).

Figure 17:
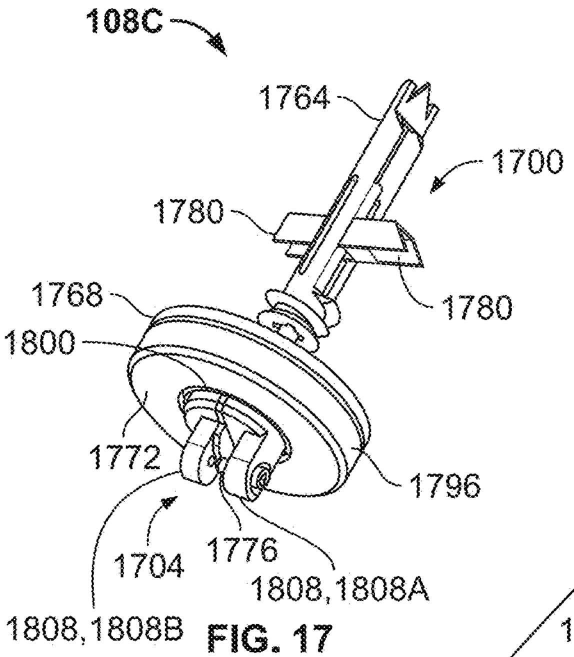
FIG. 17 is a close-up view of the third light fixture shown in FIG. 13.
Figure 18:
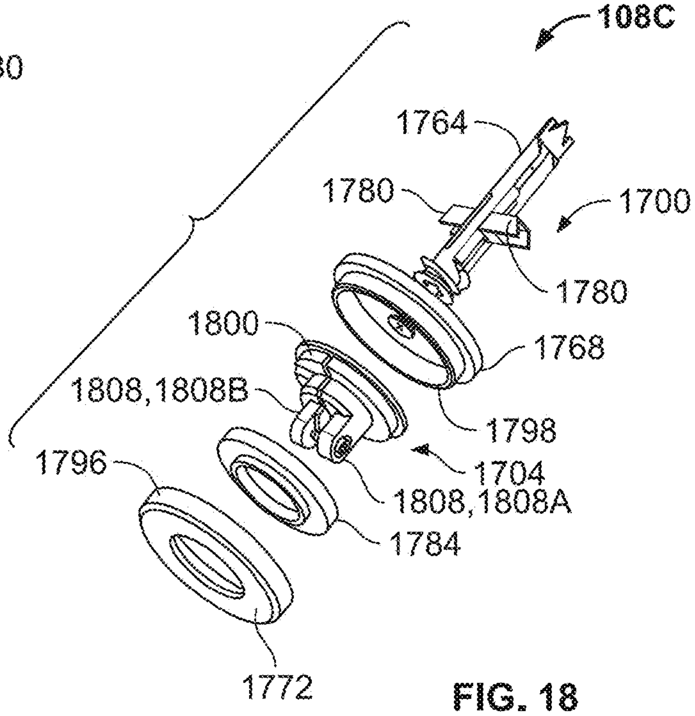
FIG. 18 is an exploded view of FIG. 17.
Figure 19:
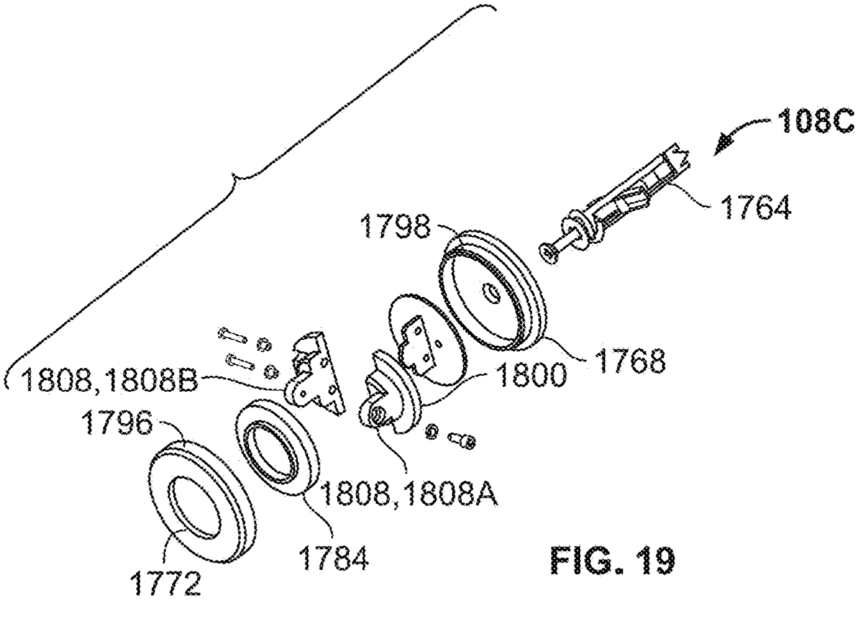
FIG. 19 is another exploded view of FIG. 17.

As illustrated in FIGS. 17-19, the third light fixture 108C generally includes a mounting assembly 1700 and a connection assembly 1704 removably coupled to the mounting assembly 1700. The connection assembly 1704 is structurally and functionally similar to the first canopy connection assembly 154 of the first light fixture 108A, in that the connection assembly 1704 includes a base 1800 (similar to the base 200) and a pair of connectors 1808 (similar to the connectors 208) coupled to the base 1800. Meanwhile, the mounting assembly 1700 is functionally similar to the first canopy assembly 150 of the first light fixture 108A, in that the mounting assembly 1700 is generally configured to be partially disposed in and engage the desired surface (e.g., the ceiling, floor, or other surface) in the environment 104 in order to retain the third light fixture 108C in position in or on the desired surface in the environment 104. However, the mounting assembly 1700 has a different structural arrangement than the first canopy assembly 150 of the first light fixture 108A.

In this example, the mounting assembly 1700 includes an anchor 1764, a collar 1768 coupled to the anchor 1764, and a ring 1772. In this example, the base 1800 is sized to be disposed within, and be surrounded by, the collar 1768, each of which has an annular shape. Moreover, in this example, the pair of connectors 1808 extend outward from the base 1800, with a first connector 1808A extending outward along a first axis and a second connector 1808B extending outward along a second axis parallel to the first axis, such that the second connector 1808B is spaced from the first connector 1808A. In turn, the mounting assembly 1700 also includes a recess 1776 defined between the first connector 1808A and the second connector 1808B. Like the recess 212 described above, the recess 1776 is sized to receive a portion of one of the LED modules 112 adjacent thereto in order to mechanically and electrically connect the third light fixture 108C to that LED module 112.

The anchor 1764, which in this example is a heavy duty drywall anchor, includes a pair of retractable arms 1780 that extend radially outward to secure the anchor 1764 (and the third light fixture 108C more generally) to the desired surface. The collar 1768, meanwhile, is coupled to one end of the anchor 1764 such that the collar 1768 is carried by and extends outward from the end of the anchor 1764. When the base 1800 is disposed within the collar 1768, the pair of connectors 1808 also extend outward from and of the collar 1768.

In this example, the mounting assembly 1700 can also include a washer 1784 that helps to secure the base 1800 within the collar 1768 and to position the pair of connectors 1808 properly. In this example, the washer 1784 has an annular shape and is seated against the base 1800 such that the washer 1784 is disposed outside of the collar 1768 and the pair of connectors 1808 extend outward from and of the washer 1784. As best illustrated in FIG. 17, the ring 1772 is removably coupled to the collar 1768 in order to securely retain the other components of the third light fixture 108C in place. In this example, the ring 1772 is removably coupled to the collar 1768 via a plurality of threads formed on an inner surface of a rim 1796 of the ring 1772 and configured to threadably engage a plurality of threads (not shown) formed on an outer surface 1798 of the collar 1768. In other examples, however, the ring 1772 can be coupled to the collar 1768 in a different manner and/or the ring 1772 can be coupled to a different component. In any event, when the ring 1772 is coupled to the collar 1768, the pair of connectors 1808 extend outward from and of the ring 1772, such that the pair of connectors 1808 are arranged to engage one of the LED modules 112 positioned adjacent thereto.

Because the system 100 is a constant voltage system, and because the connection assembly 1704 is configured to provide both a mechanical and electrical connection, the connection assembly 1704 has a positive side (with positive polarity) and a negative side (with negative polarity). Preferably, the positive side is isolated from the negative side (and vice versa) by the washer 1784. While not explicitly illustrated herein, the connection assembly 1704 in this example is approximately divided in half, with a first, positive half that is marked with a positive indicator (e.g., like the positive indicator 234), and a second, negative half. In this example, the first, positive half includes the first connector 1808A and the second, negative half includes the second connector 1808B. In other examples, however, the first half can have a negative polarity and the second half can have a positive polarity.

Figure 20:
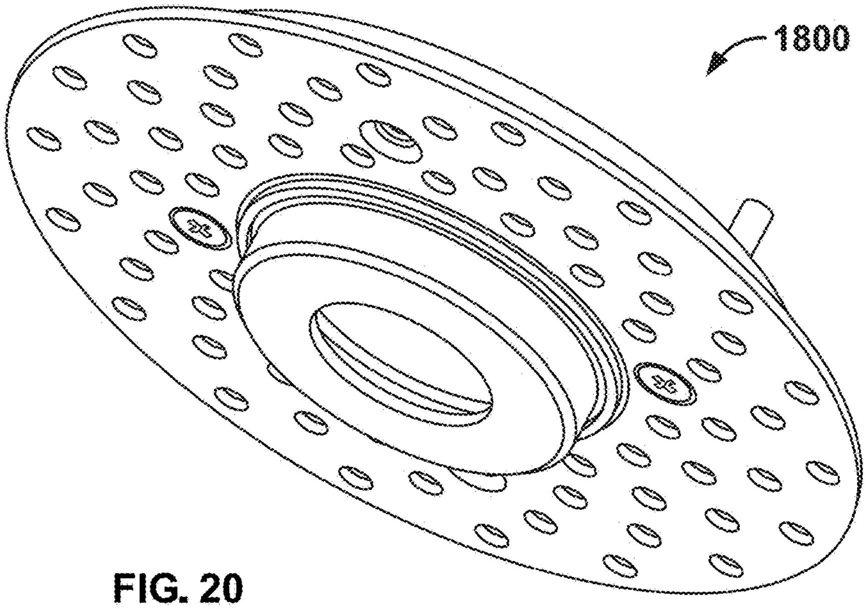
FIG. 20 is a perspective view of another light fixture of the modular, recessed lighting system of FIG. 1.
Figure 21:
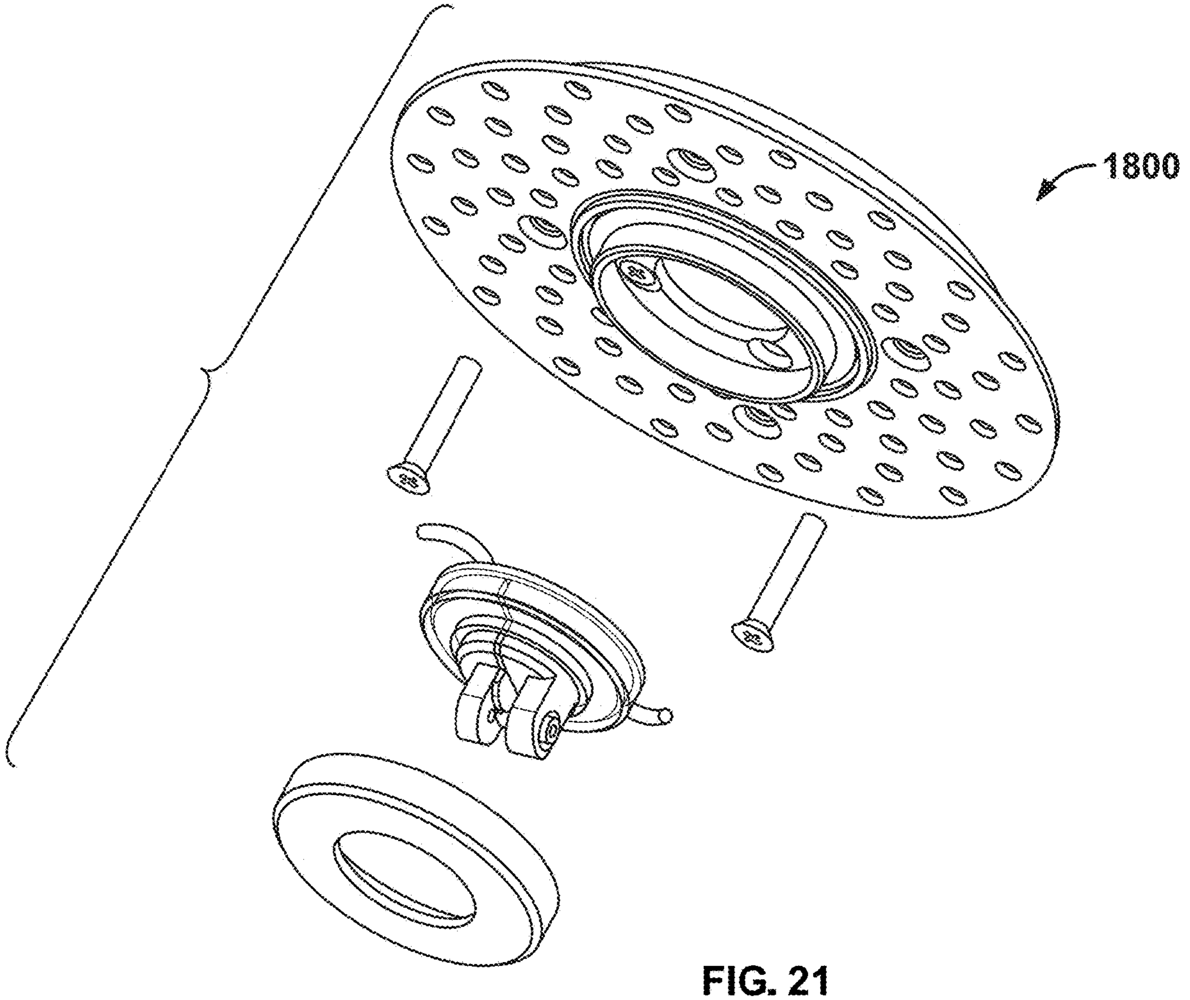
FIG. 21 is an exploded view of the light fixture of FIG. 20.

FIGS. 20 and 21 illustrate another example of a light fixture 1800 that is constructed in accordance with the principles of the present disclosure and can be employed in the modular, recessed lighting system 100 (instead of or in addition to the first, second, and third light fixtures 108A, 108B, 108C). The light fixture 1800 is substantially similar to the first light fixture 108A, with the exception that the light fixture 1800 is installed differently than the first light fixture 108A. Unlike the first light fixture 108A, the light fixture 1800 is configured to be mudded to the desired surface in the environment 104 such that the light fixture 1800 is fully recessed within and substantially flush with the desired surface. Thus, the light fixture 1800 need not include a cover plate such as the cover plate 170. The light fixture 1800 can thus be referred to herein as a flangeless light fixture (as opposed to the first light fixture 108A, which can be referred to herein as a flanged light fixture).

Figure 22:
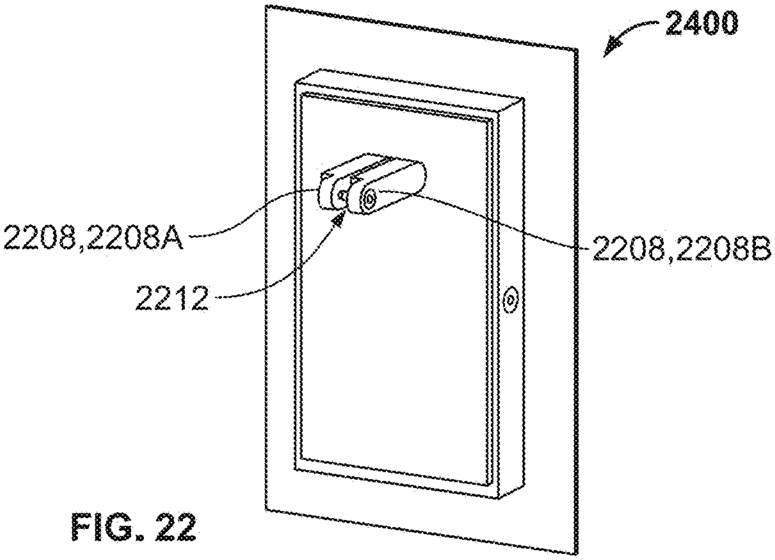
FIG. 22 is a perspective view of another light fixture of the modular, recessed lighting system of FIG. 1.
Figure 23:
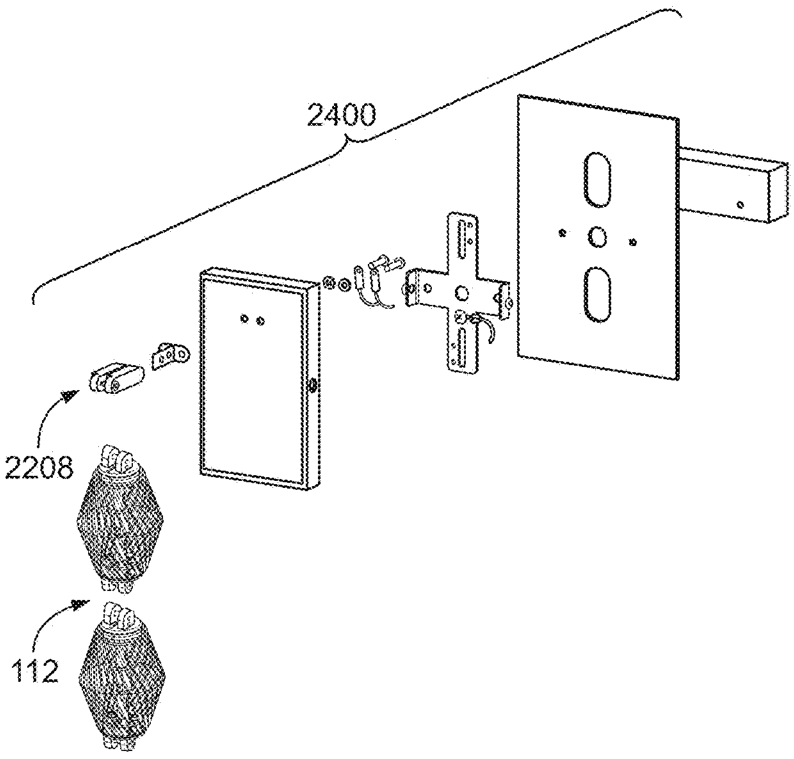
FIG. 23 is an exploded view of the light fixture of FIG. 22.
Figure 24:
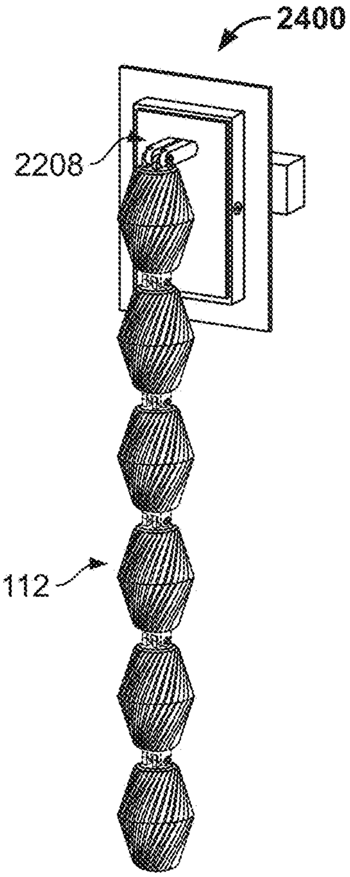
FIG. 24 illustrates a plurality of LED modules coupled to the light fixture of FIG. 22.

FIGS. 22-24 illustrate another example of a light fixture 2200 that is constructed in accordance with the principles of the present disclosure and can be employed in the modular, recessed lighting system 100 (instead of or in addition to the light fixtures 108A, 108B, 108C, and 1800), as well as a plurality of LED modules 112 coupled to one another and to the light fixture 2200 (with one of the LED modules 112 directly coupled thereto). The light fixture 2200 is similar to the other light fixtures 108A, 108B, 108C, and 1800, in that the light fixture 2200 includes a pair of connectors 2208 that extend outward, with a first connector 2208A extending outward along a first axis and a second connector 2208B extending outward along a second axis parallel to the first axis, such that the second connector 2208B also includes a recess 2212 defined between the first and second connectors 2208A, 2208B. Consistent with the discussion above, the recess 2212 is sized to receive a portion of an LED module 112 directly coupled to the light fixture 2200 in order to mechanically and electrically connect the LED module 112 to the light fixture 2200 (and vice-versa). However, unlike the other light fixtures 108A, 108B, 108C, and 1800, the light fixture 2200 is adapted to be installed such that the pair of connectors 2208 extend outward in a direction that is substantially perpendicular (if not entirely perpendicular) to the plurality of LED modules 112, as best illustrated in FIG. 24. More particularly, the first and second axes (along which the first and second connectors 2208A, 2208B respectively extend) are oriented substantially perpendicular (if not entirely perpendicular) to the plurality of LED modules 112. Further yet, while not illustrated herein, it will be appreciated that the light fixture 2200 includes a variable power supply that can be adjusted to increase or decrease the number of LED modules 112 that can be coupled to and powered by the light fixture 2200.

Figure 25:
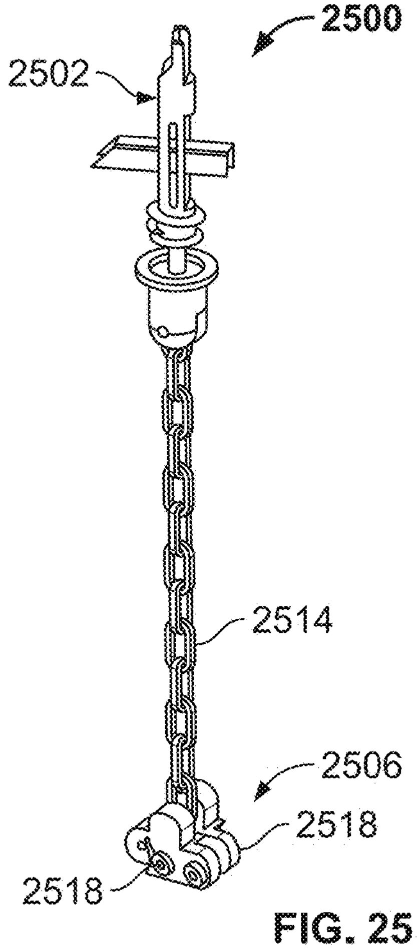
FIG. 25 is a perspective view of another light fixture of the modular, recessed lighting system of FIG. 1.
Figure 26:
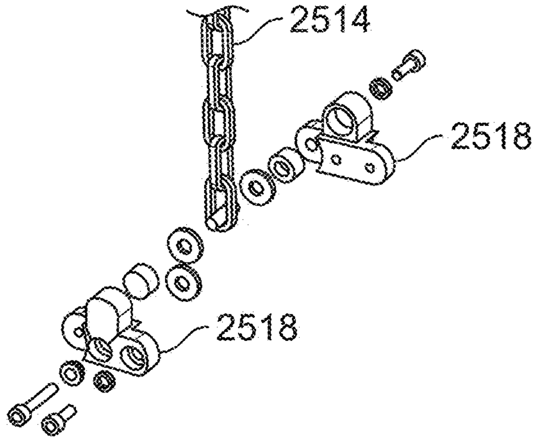
FIG. 26 is an exploded view of a portion of the light fixture of FIG. 25.

FIGS. 25 and 26 illustrate another example of a light fixture 2500 that is constructed in accordance with the principles of the present disclosure and can be employed in the modular, recessed lighting system 100 (instead of or in addition to the light fixtures 108A, 108B, 108C, 1800, and 2200). The light fixture 2500 is most similar to the third light fixture 108C, as the light fixture 2500 is also a stand-off fixture. Like the third light fixture 108C, the light fixture 2500 generally includes a mounting assembly 2502 and a connection assembly 2506 coupled to the mounting assembly 2502.

Figure 27:
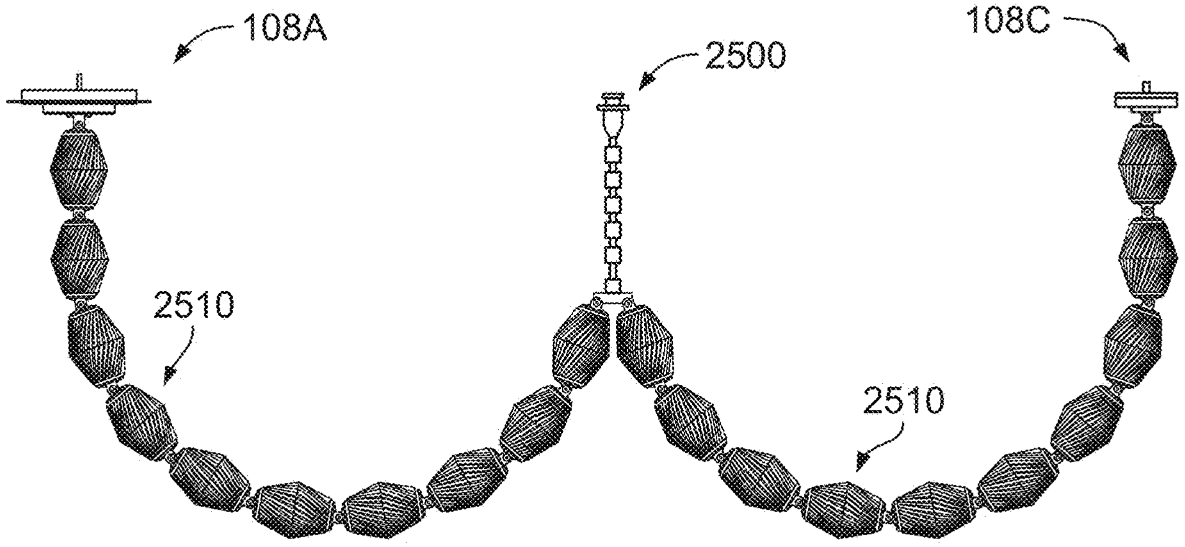
FIG. 27 illustrates two strings of LED modules coupled to the light fixture of FIG. 25.

The mounting assembly 2502 is functionally identical to the connection assembly 1700 of the third light fixture 108C. However, the connection assembly 2506 is structurally and functionally different from the connection assembly 1704 of the third light fixture 108C. Generally speaking, the connection assembly 2506 is adapted to be coupled to two different strings 2510 of LED modules 112 so as to connect those two different strings 2510 of LED modules 112 together, as illustrated in FIG. 27. In particular, the connection assembly 2506 takes the form of a chain 2514 and two pairs of connectors 2518 coupled to the chain 2514. Each of the pairs of connectors 2518 is similar to, for example, the connectors 1808 discussed above, with a first pair of connectors 2518 extending outward in a first direction and adapted to be directly coupled to an LED module 112 of a first string 2510 of LED modules 112, and a second pair of connectors 2518 extending outward in a second direction and adapted to be directly coupled to an LED module 112 of a second string 2510 of LED modules 112. It will be appreciated that the chain 2514 can be adjusted (e.g., lengthened, shortened) in order to move the ends of the strings 2510 of LED modules 112 closer to or further from the mounting assembly 2502 (and, in turn, the desired surface to which the mounting assembly 2502 is installed).

Figure 28:
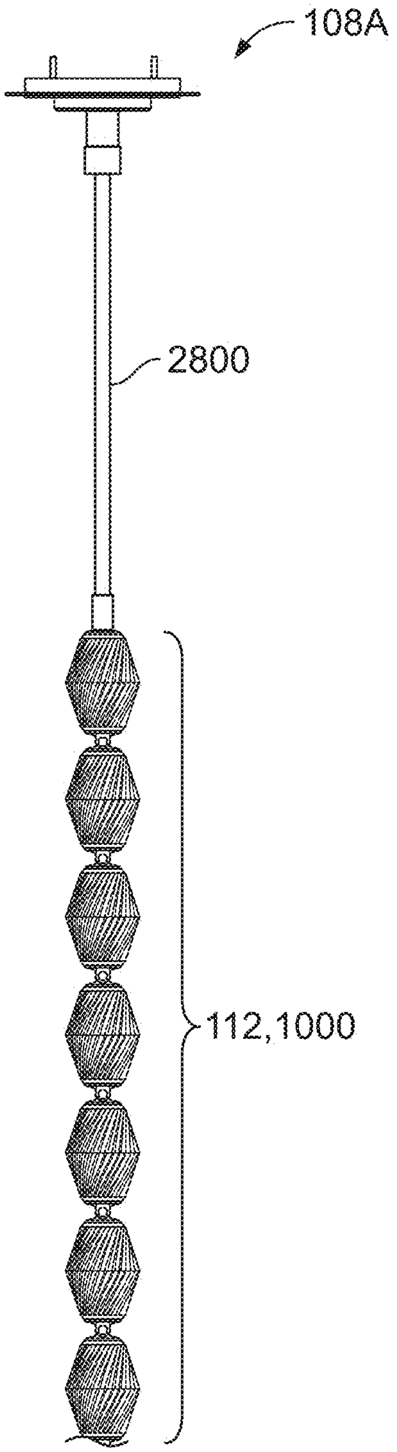
FIG. 28 is similar to FIG. 9 but illustrates a stem disposed between the first light fixture and the plurality of LED modules.
Figure 29:
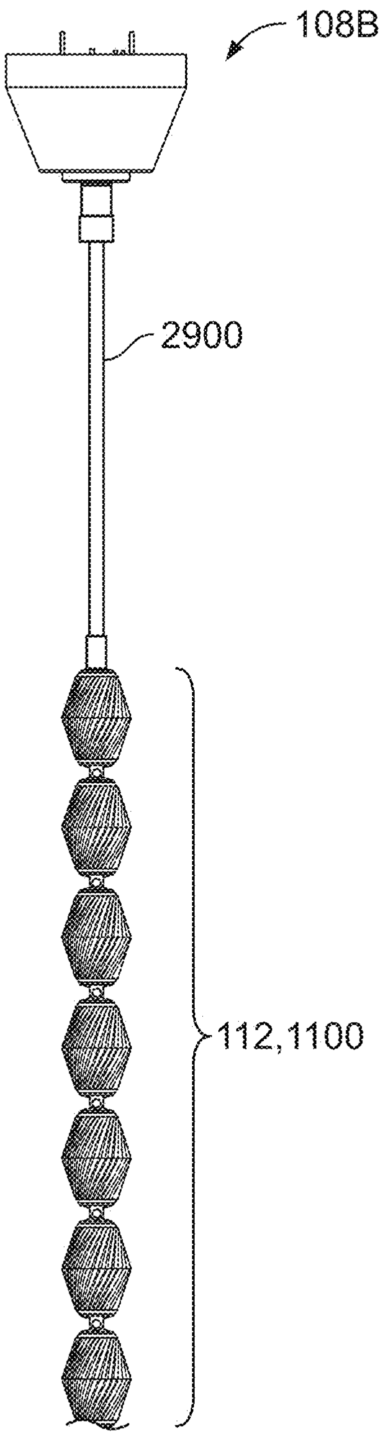
FIG. 29 is similar to FIG. 10 but illustrates a stem disposed between the second light fixture and the plurality of LED modules.

Finally, it will be appreciated that the modular, recessed lighting system 100 can be customized to include other components that help to satisfy additional or different aesthetic and/or illuminative requirements than the components discussed herein. The modular, recessed lighting system 100 can, for example, include one or more stems that can be removably coupled between one of the light fixtures and one of the LED modules 112. In some cases, the modular, recessed lighting system 100 can include a plurality of differently sized stems (e.g., one or more stems having a length of 12 inches and one or more stems having a length of 6 inches). The one or more stems, which can be removably coupled to one another (e.g., via a threaded connection) as desired, can in turn move the LED module 112 directly coupled thereto (as well as any LED modules 112 coupled to that LED module 112) further away from the light fixture to which the LED module(s) 112 is/are coupled. FIG. 28 illustrates one such example, in which a stem 2800 is directly coupled to both the first light fixture 108A and directly coupled to the string 1000 of LED modules 112, such that the stem 2800 is disposed between the first light fixture 108A and the string 1000 of LED modules 112 and thereby moving the string 1000 of LED modules 112 further from the first light fixture 108A (and the desired surface to which the first light fixture 108A is installed). FIG. 29 illustrates another such example, in which a stem 2900 is directly coupled to both the second light fixture 108B and directly coupled to the string 1100 of LED modules 112, such that the stem 2900 is disposed between the second light fixture 108B and the string 1100 of LED modules 112 and thereby moving the string 1100 of LED modules 112 further from the second light fixture 108B (and the desired surface to which the second light fixture 108B is installed).

While the invention has been described in connection with various embodiments, it will be understood that the invention is capable of further modifications. This application is intended to cover any variations, uses or adaptations of the invention following, in general, the principles of the invention, and including such departures from the present disclosure as, within the known and customary practice within the art to which the invention pertains.

The invention claimed is:

1. A light-emitting diode (LED) module for use in a modular lighting system installed in an environment, the LED module configured to illuminate the environment and comprising:

a housing;

a first printed circuit board (PCB) disposed within the housing;

a first LED disposed on the first PCB and configured to emit light;

a connector assembly extending through the housing, the connector assembly adapted to removably, mechanically, and electrically connect the LED module to another LED module or a light fixture in the modular lighting system, wherein the connector assembly comprises a first connector sub-assembly and a second connector sub-assembly electrically connected to the first connector sub-assembly, the first connector sub-assembly extending outward from the first end of the housing, and the second connector sub-assembly extending outward from the second end of the housing, and wherein each of the first and second connector sub-assemblies comprises an annular base, a first connector extending outward from the annular base along a first axis, and a second connector extending outward from the annular base along a second axis different from the first axis, wherein each of the first and second connector sub-assemblies further comprises a canopy stem, a collar, and a ring, wherein the annular base is disposed within the collar and the ring is removably coupled to the collar such that the first and second connectors extend outward from the ring.

2. The LED module of claim 1, wherein the connector assembly is rotatable within the housing and/or wherein the connector assembly is removably coupled to the housing.

3. The LED module of claim 1, wherein the second connector is electrically isolated from the first connector.

4. The LED module of claim 1, further comprising a recess defined between the first connector and the second connector, the recess sized to receive a third connector of the another LED module.

5. The LED module of claim 1, further comprising a plurality of decorative features circumferentially arranged on an exterior surface of the housing.

6. The LED module of claim 1, further comprising a recess defined by the connector assembly, the recess sized to receive a connector assembly of the another LED module or the light fixture.

7. A modular lighting system adapted to be installed in an environment, the modular lighting system configured to illuminate the environment and comprising:

a first light-emitting diode (LED) module comprising a first housing, a first LED carried by the first housing and configured to emit light into the environment, and a first connector assembly extending through and outward from an end of the first housing; and a second LED module comprising a second housing, a second LED carried by the second housing and configured to emit light into the environment, and a second connector assembly extending through and outward from an end of the second housing, wherein the first connector assembly is configured to mechanically and electrically connect the first LED module to a first light fixture of the modular lighting system, wherein the second connector assembly is configured to mechanically and electrically connect the second LED module to the first LED module, wherein the first LED module is interchangeable with a third LED module comprising a third connector assembly configured to mechanically and electrically connect the third LED module to both the second LED module and the first light fixture, wherein each of the first and second connector assemblies comprises a first connector sub-assembly and a second connector sub-assembly, the first connector sub-assemblies extending outward from a first end of the first and second housings, respectively, and the second connector sub-assemblies extending outward from a second end of the first and second housings, respectively, wherein each of the first and second connector sub-assemblies comprises a first connector extending along a first axis and a second connector extending along a second axis different from the first axis, and wherein the first and second connector assemblies extend entirely through the first and second housings, respectively.

8. The modular lighting system of claim 7, wherein the first LED module further comprises a fourth connector assembly extending through and outward from a second end of the first housing opposite the first end, wherein the second connector assembly is configured to mechanically and electrically connect the second LED module to the first LED module via engagement with the fourth connector assembly, wherein the second connector assembly further comprises a recess defined between the first connector and the second connector, wherein the fourth connector assembly further comprises a first connector, a second connector, and a recess defined between the first connector and the second connector, and wherein when the second connector assembly engages the fourth connector assembly, the first connector of the fourth connector assembly is disposed within the recess of the second connector assembly.

9. The modular lighting system of claim 8, wherein the second connector is electrically isolated from the first connector.

10. The modular lighting system of claim 8, wherein the first and second connector assemblies are rotatable within the first and second housings, respectively.

11. The modular lighting system of claim 8, wherein when the second LED module is mechanically and electrically connected to the first LED module, a portion of the second LED module is disposed in a recess defined by the first LED module.

12. The modular lighting system of claim 8, wherein when the second connector assembly engages the fourth connector assembly, the first connector of the second connector assembly is disposed within the recess of the fourth connector assembly.

13. The modular lighting system of claim 7, the modular lighting system comprising:

the first light fixture comprising a first mounting assembly adapted to engage a first desired surface in the environment;

a second light fixture comprising a second mounting assembly adapted to engage a second desired surface in the environment;

a plurality of light-emitting diode (LED) modules mechanically and electrically connected to the first mounting assembly and/or the second mounting assembly, wherein the plurality of LED modules comprises:

the first light-emitting diode (LED) module; and the second LED module, wherein the first connector assembly is configured to mechanically and electrically connect the first LED module to the first light fixture via the first mounting assembly, and wherein the second connector assembly is configured to mechanically and electrically connect the second LED module to the first LED module or to the second light fixture via the second mounting assembly.

14. The modular lighting system of claim 13, further comprising a hub connector configured to mechanically connect but electrically isolate the first LED module and the second LED module.

15. The modular lighting system of claim 13, wherein the first and second connector assemblies are rotatable within the first and second housings, respectively.

* * * * *